(12) United States Patent
Torno

(10) Patent No.: US 8,788,563 B2
(45) Date of Patent: Jul. 22, 2014

(54) METHOD OF ADDITION WITH MULTIPLE OPERANDS, CORRESPONDING ADDER AND COMPUTER PROGRAM PRODUCT

(75) Inventor: Daniel Torno, Orleans (FR)

(73) Assignee: SARL Daniel Torno, Orleans (FR)

( * ) Notice: Subject to any disclaimer, the term of this patent is extended or adjusted under 35 U.S.C. 154(b) by 961 days.

(21) Appl. No.: 12/936,337

(22) PCT Filed: Apr. 2, 2009

(86) PCT No.: PCT/EP2009/053976
§ 371 (c)(1),
(2), (4) Date: Dec. 28, 2010

(87) PCT Pub. No.: WO2009/121943
PCT Pub. Date: Oct. 8, 2009

(65) Prior Publication Data
US 2011/0106869 A1 May 5, 2011

(30) Foreign Application Priority Data

Apr. 2, 2008 (FR) ...................................... 08 52189

(51) Int. Cl.
*G06F 7/50* (2006.01)
(52) U.S. Cl.
USPC .......................................... 708/700; 708/232
(58) Field of Classification Search
USPC .................................. 708/700–714
See application file for complete search history.

(56) References Cited

U.S. PATENT DOCUMENTS

| 6,567,835 B1 | 5/2003 | Blomgren et al. |
| 6,578,063 B1 | 6/2003 | Kojima et al. |

(Continued)

FOREIGN PATENT DOCUMENTS

| WO | 2007122318 A1 | 11/2007 |
| WO | 2007122319 A1 | 11/2007 |

OTHER PUBLICATIONS

Fang Lu et al., "A High-Speed CMOS Full-Adder Cell Using a New Circuit Design Technique—Adaptively-Biased Pseudo-NMOS Logic" Proceedings of the International Symposium on Circuits and Systems, New Orleans, May 1, 1990.
International Search Report and Written Opinion dated Jun. 15, 2009 for corresponding International Application No. PCT/EP2009/053976, filed Apr. 2, 2009.

(Continued)

*Primary Examiner* — Chuong D Ngo
*Assistant Examiner* — Kevin G Hughes
(74) *Attorney, Agent, or Firm* — David D. Brush; Westman, Champlin & Koehler, P.A.

(57) ABSTRACT

A method is provided for adding binary numbers, each of N bits, based on an accumulation mechanism which, for each iteration of index i+1 with I>0, generates an estimation signal $U^{i+1}$ on N bits and a correction signal $R^{i+1}$ on N bits, on the basis of a binary input number c, an estimation signal $U^i$ and a correction signal $R^i$ on N bits emanating from a previous iteration i. The estimation signal $U^i$ and the correction signal $R^i$ represent a sum of a least two binary numbers in redundant form. The estimation signal $U^{i+1}$ and the correction signal $R^{i+1}$ represent, in redundant form, the sum of the at least two binary numbers in redundant form and the binary number c. In other words, such a method makes it possible to sum a further binary number with a result represented in a redundant binary form of the type "U/R", this result resulting from an initialization or a previous summation, and then to generate a result also in a redundant binary form of the type "U/R". More precisely, method makes it possible to carry out this summation as many times as there are binary numbers to be added.

12 Claims, 11 Drawing Sheets

(56) References Cited

U.S. PATENT DOCUMENTS

| | | |
|---|---|---|
| 8,167,355 B2 | 5/2012 | Guetet |
| 2004/0111455 A1 | 6/2004 | Skull |
| 2007/0027946 A1* | 2/2007 | Visalli et al. .................. 708/700 |
| 2008/0228847 A1* | 9/2008 | Torno ............................ 708/710 |
| 2009/0204659 A1* | 8/2009 | Torno ............................ 708/714 |

OTHER PUBLICATIONS

English Translation of Written Opinion dated Jun. 15, 2009 for corresponding International Application No. PCT/EP2009/053976, filed Apr. 2, 2009.

* cited by examiner

| | | | | | | | | | | | | | | | | |
|---|---|---|---|---|---|---|---|---|---|---|---|---|---|---|---|---|
| E1 | 0 | 0 | 0 | 1 | 0 | 1 | 0 | 0 | 1 | 1 | 0 | 1 | 0 | 1 | 1 | 1 |
| E2 | 0 | 0 | 0 | 1 | 1 | 0 | 1 | 0 | 0 | 1 | 1 | 1 | 1 | 0 | 0 | 0 |
| E3 | 0 | 0 | 0 | 1 | 1 | 0 | 1 | 0 | 1 | 0 | 1 | 0 | 1 | 1 | 1 | 0 |
| U0 | 1 | 1 | 1 | 0 | 1 | 0 | 1 | 1 | 1 | 1 | 1 | 1 | 1 | 1 | 1 | 0 |
| R0 | 1 | 1 | 1 | 0 | 0 | 0 | 1 | 0 | 0 | 0 | 0 | 0 | 0 | 0 | 0 | 1 |
| E4 | 0 | 0 | 0 | 1 | 1 | 1 | 1 | 0 | 1 | 1 | 1 | 0 | 1 | 0 | 1 | 1 |
| U1 | 1 | 1 | 0 | 0 | 0 | 0 | 0 | 0 | 1 | 1 | 1 | 0 | 1 | 0 | 0 | 1 |
| R1 | 1 | 0 | 1 | 0 | 1 | 0 | 0 | 0 | 0 | 0 | 0 | 0 | 0 | 0 | 0 | 1 |
| E5 | 0 | 0 | 0 | 1 | 0 | 0 | 1 | 1 | 1 | 1 | 0 | 1 | 0 | 0 | 1 | 0 |
| U2 | 1 | 1 | 1 | 1 | 1 | 0 | 1 | 0 | 1 | 1 | 1 | 0 | 1 | 0 | 0 | 1 |
| R2 | 1 | 0 | 0 | 0 | 0 | 0 | 1 | 0 | 0 | 1 | 1 | 1 | 0 | 1 | 1 | 1 |
| E6 | 0 | 0 | 0 | 1 | 1 | 1 | 1 | 0 | 0 | 1 | 0 | 0 | 1 | 0 | 0 | 0 |
| U3 | 1 | 0 | 0 | 1 | 0 | 0 | 1 | 1 | 0 | 0 | 0 | 0 | 0 | 1 | 0 | 1 |
| R3 | 0 | 0 | 0 | 0 | 1 | 0 | 0 | 0 | 0 | 0 | 0 | 0 | 0 | 0 | 1 | 1 |
| E7 | 0 | 0 | 0 | 1 | 0 | 1 | 1 | 0 | 0 | 0 | 1 | 0 | 1 | 1 | 0 | 1 |
| U4 | 1 | 0 | 1 | 0 | 1 | 0 | 1 | 1 | 0 | 0 | 1 | 0 | 0 | 0 | 0 | 0 |
| R4 | 0 | 0 | 0 | 0 | 1 | 0 | 1 | 0 | 0 | 0 | 0 | 1 | 0 | 0 | 0 | 1 |
| S | 1 | 0 | 1 | 1 | 0 | 0 | 0 | 1 | 0 | 0 | 1 | 0 | 1 | 1 | 1 | 1 |

Figure 11

METHOD OF ADDITION WITH MULTIPLE OPERANDS, CORRESPONDING ADDER AND COMPUTER PROGRAM PRODUCT

CROSS-REFERENCE TO RELATED APPLICATIONS

This Application is a Section 371 National Stage Application of International Application No. PCT/EP2009/053976, filed Apr. 2, 2009 and published as WO 2009/121943 on Oct. 8, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of digital information processing circuits and systems and, more particularly, digital signal processing computers performing the addition of binary numbers.

The disclosure has numerous applications, e.g., such as in microprocessors, digital signal processors (DSPs), application specific integrated circuits (ASICs), or very large scale integration (VLSI), or else optical or quantum computers within neural networks.

More precisely, the disclosure relates to an addition technique using multiple operands enabling a result to be provided in a redundant binary form.

The disclosure applies, in particular, but not exclusively, to digital signal processing for summing and/or accumulating results within the framework of digital filter production, for example.

Since binary addition is the most widely used of arithmetic operations, the disclosure can be applied more generally to any circuit, system or device requiring summation of several operands.

BACKGROUND OF THE DISCLOSURE

Adders are extremely common and indispensable operators not only in the arithmetic units of digital signal processing microprocessors and processors but likewise in all logic circuits.

However, adders often prove to be the critical operators of a digital processing system, in particular during certain implementations, both from the viewpoint of the speed of execution thereof and the viewpoint of the design and testability of same.

As a matter of fact, nowadays, the creation of algorithms of increasing complexity within computers makes the architecture of the operators increasingly difficult to implement and, in particular, compactness problems arise. A choice must therefore generally be made between complexity and speed of execution.

The technical problem of the computing speed with respect to binary number addition operations is a problem known to those skilled in the art, and several techniques have already been proposed for addressing it.

In a first standard technique, by cascading several 1-bit full adders, the binary adder, more commonly named a Ripple Carry Adder (RCA), enables the carry digit to be propagated from adder to adder.

The disadvantage of this first standard technique is the slowness of the computations that it implements. As a matter of fact, the computing time depends directly on the time required to propagate the carry digit from adder module to adder module. Thus, this method can only be chosen for addition operations which do not exceed a few bits.

Taking account of the fact that computation of the carry digits must be accelerated, a second known technique is a carry look-ahead computation carried out with a so-called Carry Look-Ahead Adder (CLA). Such an adder facilitates, in particular, computation of the carry digits by means of an outside circuit.

However, this type of standard adder has the disadvantage of providing a propagation time that is still too long, in particular for applications including complex algorithms and requiring fast computation.

In order to prevent propagation of the carry digits and to thereby improve the execution time of the computations, another conventionally used technique consists of an addition of binary numbers in redundant form, using an adder structure also known as a carry save adder. These standard adders use redundant expressions which enable additions to be performed in parallel, and therefore without propagating carry digits.

To illustrate, the American patent documents U.S. Pat. No. 6,578,063 B1 (IBM) and U.S. Pat. No. 6,567,835 B1 (IN-TRINSITY) propose two binary number adder architectures of the "carry save" type. These two architectures enable five binary numbers to be added and to furnish the result thereof in the form of a sum and a carry digit. The conventional method cited in these documents consists in using, in particular, a redundant representation of each of the added binary numbers.

However, the standard "carry save" layout described requires a significant number of logic gates and intermediate digital processing stages. Since the architecture and layout of the logic devices is not optimised, this method involves a still significant propagation time.

One known technique, as described in the international application WO2007122319 (TORNO), consists in making several estimates of bit values of the sum of two binary numbers, by means of a "U/R" type redundant binary representation of the intermediate computation results, and in successively correcting these estimates using a correction signal. The number of logic gates and intermediate digital processing stages of this type of adder is thereby reduced.

This method, which is based on a "U/R" type representation, is today unfortunately applicable only for adding two binary numbers. Accordingly, if it is desired to add more than two binary numbers, this method must be applied to two numbers, and then (as many times as necessary) to the result of a preceding addition and a new binary number. This solution is not optimal.

SUMMARY

In one particular embodiment of the invention, an addition method is proposed for adding a plurality of input binary numbers each of N bits, the method comprising at least one iteration, of index i+1 with i≥0, of an accumulation step enabling an estimation signal $U^{i+1}$ to be generated on N bits and a first $R^{i+1}$ or second $H^{i+1}$ correction signal to be generated on N bits,
according to the following equations:

$$\begin{cases} U_n^{i+1} = U_n^i \oplus R_n^i \oplus U_{n-1}^i \oplus c_n \\ R_{n+1}^{i+1} = (U_n^i \oplus R_n^i \oplus U_{n-1}^i) \cdot (U_n^i \oplus c_n) \end{cases}$$

or according to the following equations:

$$\begin{cases} U_n^{i+1} = U_n^i \oplus H_n^i \oplus c_n \\ H_{n+1}^{i+1} = (U_n^i \oplus H_n^i) \cdot (\overline{U_n^i \oplus c_n}) \oplus c_n \end{cases}$$

with:
$U^{i+1}{}_n$: a value of the bit of rank n of said estimation signal $U^{i+1}$, with 0≤n≤N−1, obtained during said iteration of index i+1;
$U^i{}_n$: a value of the bit of rank n of an estimation signal $U^i$, obtained during a preceding iteration of index i if i>0, or a determined initialization value $U^0{}_n$ of the bit of rank n of an estimation signal $U^i$ if i=0;
$U^i{}_{n-1}$: a value of the bit of rank n−1 of said estimation signal $U^i$, obtained during a preceding iteration of index i if n>0 and if i>0,
or a determined initialization value $U^0{}_{n-1}$ of the bit of rank n−1 of said estimation signal $U^i$ if n>0 and i=0,
or a predetermined initialization value of a fictive bit of rank n−1 of said estimation signal $U^i$ if n=0;
$R^i{}_n$: a value of the bit of rank n of a first correction signal $R^i$, obtained during a preceding iteration of index i if n>0,
or a predetermined initialization value of the bit of rank n of said first correction signal $R^i$ if n=0;
$R^{i+1}{}_{n+1}$: a value of the bit of rank n+1 of said first correction signal $R^{i+1}$, obtained during said iteration of index i+1;
$H^i{}_n$: a value of the bit of rank n of a second correction signal $H^i$, obtained during a preceding iteration of index i;
$H^{i+1}{}_{n+1}$: a value of the bit of rank n+1 of said correction signal $H^{i+1}$, obtained during said iteration of index i+1;
$C_n$: a value of the bit of rank n of an input binary number C included in said plurality of input binary numbers and taken into account in said addition during said iteration of index i+1 of said accumulation step;
the estimation signal $U^i$ and the first correction signal $R^i$ or the second correction signal $H^i$ representing a sum of at least two binary numbers in redundant form, the estimation signal $U^{i+1}$ and the first correction signal $R^{i+1}$ or the second correction signal $H^{i+1}$ representing the sum of said at least two binary numbers in redundant form and of the binary number c.

The general principle in an embodiment of the invention therefore consists in summing an additional binary number with a result represented in a "U/R" type redundant binary form (this result being the result of an initialization or preceding summation), and in then generating a result likewise in a "U/R" type redundant binary form.

More precisely, such a method enables this summation to be carried out as many times as there are binary numbers to be added. Reference is then made to steps of accumulating intermediate results of computation.

More precisely, at each accumulation step, an estimation signal U and a correction signal R are generated on N bits in the form of a redundant binary representation.

In this way, such a method enables an additional standard binary number to be summed while preventing the carry digits from propagating.

The iteration of index 1 of said accumulation step is advantageously replaced by an initialization step enabling an estimation signal $U^1$ to be generated on N bits and first $R^1$ or second $H^1$ correction signal to be generated on N bits,
according to the following equations, with 0≤n≤N−1:

$$\begin{cases} U_n^1 = \overline{a_n \oplus b_n \oplus c_n} \\ R_{n+1}^1 = \overline{(a_n \oplus b_n)}(\overline{b_n \oplus c_n}) \end{cases}$$

or according to the following equations, with 0≤n≤N−1:

$$\begin{cases} U_n^1 = \overline{a_n \oplus b_n \oplus c_n} \\ H_{n+1}^1 = \overline{(a_n \oplus b_n)}(b_n \oplus c_n) \oplus c_n \end{cases}$$

with:
$a_n$: a value of the bit of rank n of an input binary number A included in said plurality of input binary numbers and taken into account in said addition during said initialization step;
$b_n$: a value of the bit of rank n of an input binary number B included in said plurality of input binary numbers and taken into account in said addition during said initialization step;
$c_n$: a value of the bit of rank n of an input binary number C included in said plurality of input binary numbers and taken into account in said addition during said initialization step.

In this way, it is possible to initially add three binary numbers and to generate an estimation signal U and a correction signal R of first iteration.

The addition method preferably comprises the following steps:
selecting a first input binary number included in said plurality of input binary numbers;
obtaining specific initialization values for:
each of the N bits of an estimation signal $U^0$,
each of the N bits of a correction signal $R^0$,
a fictive bit of rank −1 of said estimation signal $U^0$;
iterating index 1 of said accumulation step with, as input signals, said first input binary number and said predetermined initialization values, enabling an estimation signal $U^1$ to be generated on N bits and a first $R^1$ correction signal to be generated on N bits;
as long as said plurality of input binary numbers have not been taken into account in said addition:
selecting a new input binary number included in said plurality of input binary numbers and not already selected;
iterating index i+1, with i>0, of said accumulation step with, as input signals, said new input binary number, the signals $U^i$ and $R^i$ generated during the iteration of index i of said accumulations step, a predetermined initialization value $U^i{}_{-1}$ of a fictive bit of rank −1 of said estimation signal $U^i$, and a predetermined initialization value $R^i{}_0$ of the bit of rank 0 of said first correction signal $R^i$.

In this way, an embodiment of the invention enables a set of binary numbers to be summed sequentially, as is the case, for example, for digital filters.

According to another alternative embodiment, the addition method comprises the following steps:
  selecting a first input binary number included in said plurality of input binary numbers;
  obtaining predetermined initialization values for:
    each of the N bits of an estimation signal $U^0$,
    each of the N bits of a correction signal $H^0$,
  iterating index 1 of said accumulation step with, as input signals, said first input binary number and said predetermined initialization values, enabling an estimation signal $U^1$ to be generated on N bits and a second $H^1$ correction signal to be generated on N bits;
  as long as said plurality of input binary numbers have not been taken into account in said addition:
    selecting a new input binary number included in said plurality of input binary numbers and not already selected;
    iterating index i+1, with i>0, of said accumulation step with, as input signals, said new input binary number, the signals $U^i$ and $H^i$ generated during the iteration of index i of said accumulations step, a predetermined initialization value $R^i_0$ of the bit of rank 0 of said first correction signal $R^i$.

In another advantageous embodiment of the invention, an addition device is proposed for adding a plurality of input binary numbers each of N bits. Such a device comprises at least one accumulation unit enabling, each time that it is activated, to carry out one iteration, of index i+1 with i≥0, of an accumulation mechanism, each accumulation unit comprising:
  first estimation means, enabling an estimation signal $U^{i+1}$ to be generated on N bits, and first correction means, enabling a first correction signal $R^{i+1}$ to be generated on N bits, said first estimation means and said first correction means comprising means for implementing the following equations:

$$\begin{cases} U_n^{i+1} = U_n^i \oplus R_n^i \oplus U_{n-1}^i \oplus c_n \\ R_{n+1}^{i+1} = (U_n^i \oplus R_n^i \oplus U_{n-1}^i) \cdot (U_n^i \oplus c_n) \end{cases}$$

or second estimation means, enabling an estimation signal $U^{i+1}$ to be generated on N bits, and second correction means, enabling a second correction signal $H^{i+1}$ to be generated on N bits, said second estimation means and said second correction means comprising means for implementing the following equations:

$$\begin{cases} U_n^{i+1} = U_n^i \oplus H_n^i \oplus c_n \\ H_{n+1}^{i+1} = (U_n^i \oplus H_n^i) \cdot (\overline{U_n^i \oplus c_n}) \oplus c_n \end{cases}$$

with:
$U^{i+1}_n$: value of the bit of rank n of said estimation signal $U^{i+1}$, with 0≤n≤N−1, obtained during said iteration of index i+1;
$U^i_n$: a value of the bit of rank n of an estimation signal $U^i$, obtained during a preceding iteration of index i if i>0, or a determined initialization value $U^0_n$ of the bit of rank n of an estimation signal $U^i$ if i=0.
$U^i_{n-1}$: a value of the bit of rank n−1 of said estimation signal $U^i$, obtained during a preceding iteration of index i if n>0 and if i>0,
  or a determined initialization value $U^0_{n-1}$ of the bit of rank n−1 of said estimation signal $U^i$ if n>0 and if i=0;
  or a predetermined initialization value of an fictive bit of rank n−1 of said estimation signal $U^i$ if n=0;
$R^i_n$: a value of the bit of rank n of a first correction signal $R^i$, obtained during a preceding iteration of index i if n>0,
  or a predetermined initialization value of the bit of rank n of said first correction signal $R^i$ if n=0;
$R^{i+1}_{n+1}$: a value of the bit of rank n+1 of said first correction signal $R^{i+1}$, obtained during said iteration of index i+1;
$H^i_n$: a value of the bit of rank n of a second correction signal $H^i$, obtained during a preceding iteration of index i;
$H^{i+1}_{n+1}$: a value of the bit of rank n+1 of said second correction signal $H^{i+1}$, obtained during said iteration of index i+1;
$C_n$: a value of the bit of rank n of an input binary number C included in said plurality of input binary numbers and taken into account in said addition during said iteration of index i+1.

the estimation signal $U^i$ and the first correction signal $R^i$ or the second correction signal $H^i$ representing a sum of at least two binary numbers in redundant form, the estimation signal $U^{i+1}$ and the first correction signal $R^{i+1}$ or the second correction signal. $H^{i+1}$, representing the sum of said at least two binary numbers in redundant form and of the binary number c.

In this way, the adder can receive an additional binary number at each accumulation unit, in addition to the estimation and correction signals derived from the accumulation unit situated upstream.

For each bit n, the accumulation unit advantageously comprises an accumulation sub-unit itself comprising:
  a first XOR logic gate receiving said value $U^i_{n-1}$ of the bit of rank n and of index i and said value $R^i_n$ of the bit of rank n and of index i, and generating a first intermediate signal;
  a second XOR logic gate receiving said first intermediate signal and said value $U^i_n$ of the bit of rank n and of index i, and generating a second intermediate signal;
  a third XOR logic gate receiving said second intermediate signal and said value of the bit of rank n of an input binary number C, and generating said value $U^{i+1}_n$ of the bit of rank n of said estimation signal $U^{i+1}$ for the iteration of index i+1;
  a fourth XOR logic gate receiving said value $U^i_n$ of the bit of rank n and of index i and said value $c_n$ of the bit of rank n of an input binary number C, and generating a third intermediate signal; and
  an AND logic gate receiving said third intermediate signal and said second intermediate signal, and generating said value $R^{i+1}_{n+1}$ of the bit of rank n+1 of said first correction signal $R^{i+1}$ for the iteration of index i+1.

The architecture of the accumulation unit thus enables a shorter propagation time and facilitates testability.

According to an alternative, for each bit n, the accumulation unit comprises an accumulation sub-unit itself comprising:
  a first XOR logic gate receiving said value $U^i_{n-1}$ of the bit of rank n−1 and of index i and said value $H^i_n$ of the bit of rank n and of index i, and generating a first intermediate signal;
  a second XOR logic gate receiving said first intermediate signal and said value $c_n$ of the bit of rank n of an input binary number C, and generating said value $U^{i+1}_n$ of the bit of rank n of said estimation signal $U^{i+1}$ for the iteration of index i+1;
  an XNOR logic gate receiving said value $U^i_{n-1}$ of the bit of rank n−1 and of index i and said value $c_n$ of the bit of rank n of an input binary number C and generating a second intermediate signal;

an AND logic gate receiving said first intermediate signal and said second intermediate signal and generating a third intermediate signal; and a third XOR logic gate receiving said third intermediate signal and said value $c_n$ of the bit of rank n of an input binary number C and generating said value $H^{i+1}_{n+1}$ of the bit of rank n+1 of said second correction signal $H^{i+1}$ for the iteration of index i+1.

The addition device advantageously an initialization unit comprising:

third estimation means, enabling an estimation signal $U^1$ to be generated on N bits, and third correction means $R^1$ on N bits, said third estimation means and said third correction means comprising means for implementing the following equations, with $0 \leq n \leq N-1$:

$$\begin{cases} U^1_n = \overline{a_n \oplus b_n \oplus c_n} \\ R^1_{n+1} = \overline{(a_n \oplus b_n)}(b_n \oplus c_n) \end{cases}$$

or fourth estimation means, enabling an estimation signal $U^1$ to be generated on N bits, and fourth correction means, enabling a fourth correction signal $H^1$ to be generated on N bits, said fourth estimation means and said fourth correction means comprising means for implementing the following equations, with $0 \leq n \leq N-1$:

$$\begin{cases} U^1_n = \overline{a_n \oplus b_n \oplus c_n} \\ H^1_{n+1} = \overline{(a_n \oplus b_n)}(b_n \oplus c_n) \oplus c_n \end{cases}$$

with:

$a_n$: a value of the bit of rank n of an input binary number A included in said plurality of input binary numbers and taken into account by said initialization unit;

$b_n$: a value of the bit of rank n of an input binary number B included in said plurality of input binary numbers and taken into account by said initialization unit;

$c_n$: a value of the bit of rank n of an input binary number C included in said plurality of input binary numbers and taken into account by said initialization unit;

and in that said initialization unit replaces the accumulation unit, enabling the iteration of index 1 to be carried out.

In this way, the initialization unit enables three input binary numbers to be added directly.

For each bit n, the initialization unit preferably comprises an initialization sub-unit itself comprising:

a first XNOR logic gate receiving said value $a_n$ of the bit of rank n of an input binary number A and of the said $b_n$ value of the bit of rank n of an input binary number B and generating a first intermediate signal;

an XOR logic gate receiving said first intermediate signal and said value said value $c_n$ of the bit of rank n of an input binary number C and generating said value $U^1_n$ of the bit of rank n of said estimation signal $U^1$ for the iteration of index 1;

a second XNOR logic gate receiving said value $b_n$ of the bit of rank n of an input binary number B and said value $c_n$ of the bit of rank n of an input binary number C and generating said intermediate signal; and an AND logic gate receiving said first and second intermediate signals and generating said value $R^1_{n+1}$ of the bit of rank n+1 of said correction signal $R^1$ for the iteration of index 1.

According to an alternative, for each bit n, the initialization unit comprises an initialization sub-unit itself comprising:

an XNOR logic gate receiving said value $a_n$ of the bit of rank n of an input binary number A and of the said $b_n$ value of the bit of rank n of an input binary number B and generating a first intermediate signal;

a first XOR logic gate receiving said first intermediate signal and said value said value $c_n$ of the bit of rank n of an input binary number C and generating said value $U^1_n$ of the bit of rank n of said estimation signal $U^1$ for the iteration of index 1;

a second XOR logic gate receiving said value $b_n$ of the bit of rank n of an input binary number B and said value $c_n$ of the bit of rank n of an input binary number C and generating a second intermediate signal;

an AND logic gate receiving said first and second intermediate signals and generating a third intermediate signal; and a third XOR logic gate receiving said third intermediate signal and said value $c_n$ of the bit of rank n of an input binary number C and generating said value $H^1_{n+1}$ of the bit of rank n+1 of said second correction signal $H^1$ for the iteration of index 1.

According to one advantageous characteristic, the device comprises:

first means for selection, enabling selection of a first input binary number included in said plurality of input binary numbers;

means for obtaining predetermined initialization values for:

each of the N bits of an estimation signal $U^0$, each of the N bits of a correction signal $R^0$, a fictive bit of rank −1 of said estimation signal $U^0$;

first activation means enabling said accumulation unit to be activated in order for it to carry out the iteration of index 1 of said accumulation mechanism with, as input signals, said first input binary number and said predetermined initialization values, enabling an estimation signal $U^1$ to be generated on N bits and a first $R^1$ correction signal to be generated on N bits;

second activation means enabling the following means to be activated, as long as said plurality of input binary numbers have not been taken into account in said addition:

second means for selection, enabling selection of a new input binary number included in said plurality of input binary numbers and not already selected;

said accumulation unit in order for same to carry out an iteration of index i+1, with i>0, of said accumulation mechanism with, as input signals, said new input binary number, the signals $U^i$ and $R^i$ generated during the iteration of index i of said accumulation mechanism, a predetermined initialization value $U^i_{-1}$ of a fictive bit of rank −1 of said estimation signal $U^i$, and a predetermined initialization value $R^i_0$ of the bit of rank 0 of said first correction signal $R^i$.

A single accumulation unit is thus sufficient.

According to an alternative embodiment, the addition device comprises:

first means for selection enabling selection of a first input binary number included in said plurality of input binary numbers;

means for obtaining predetermined initialization values for:

each of the N bits of an estimation signal $U^0$, each of the N bits of a correction signal $H^0$, first activation means enabling said accumulation unit to be activated in order for it to carry out the iteration of index 1 of said accumulation mechanism with, as input signals, said first input binary number and said predetermined initialization values, enabling an estimation signal $U^1$ to be generated on N bits and a second $H^1$ correction signal to be generated on N bits;

second activation means enabling the following means to be activated, as long as said plurality of input binary numbers have not been taken into account in said addition:

second means of selection, enabling selection of a new input binary number included in said plurality of input binary numbers and not already selected;

said accumulation unit in order for same to carry out an iteration of index i+1, with i>0, of said accumulation mechanism with, as input signals, said new input binary number, the signals $U^1$ and $H^i$ generated during the iteration of index i of said accumulation mechanism, a predetermined initialization value $R^i_0$, of the bit of rank 0 of said first correction signal $R^i$.

In another embodiment, the invention relates to a computer program product downloadable from a communication network and/or recorded on a computer-readable medium and/or executable by a processor, including program code instructions for implementing the decoding method as described above.

BRIEF DESCRIPTION OF THE DRAWINGS

Other characteristics and advantages of embodiments of the invention will become apparent upon reading the following description, given for illustrative and non-limiting purposes (all of the embodiments of the invention are not limited to the characteristics and advantages of the embodiments described hereinbelow), and from the appended drawings, in which:

FIG. 11 shows an example of digital computation of a seven-operand summation carried out by the adder of FIG. 9.

DETAILED DESCRIPTION OF ILLUSTRATIVE EMBODIMENTS

In all of the figures of this document, identical elements and steps are designated by a single numerical reference.

Figure 1:
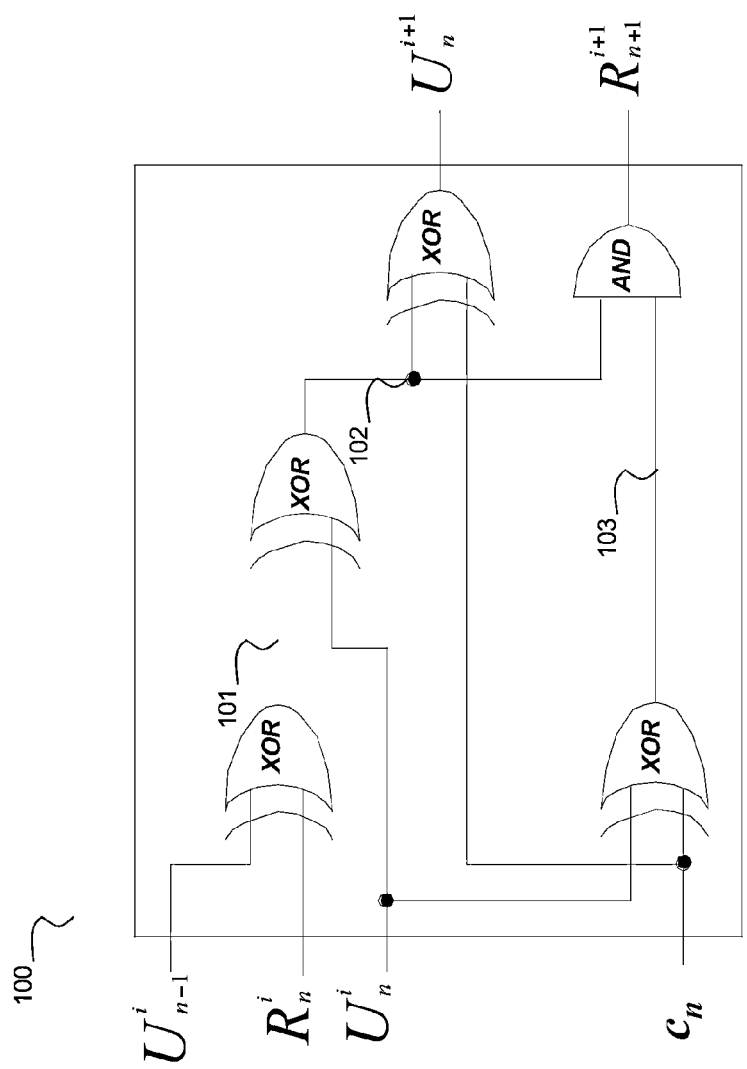
FIG. 1 shows a logic architecture for an accumulation module in U/R form, according to one particular embodiment of the invention.

A logic architecture will now be introduced in connection with FIG. 1, for an accumulation module in U/R form, according to a particular embodiment of the invention, which implements the accumulation step of the method according to an embodiment of the invention.

More particularly, for a given bit of rank n, the accumulation module 100 makes it possible to add a result expressed in a redundant binary form "$U^i/R^i$" derived from an iteration of index i (i≥0) and a standard binary number, referenced as C, and to once again provide a binary result thereof in redundant form "$U^{i+1}/R^{i+1}$" obtained for an iteration of index i+1. The accumulation mechanism put into place by the module 100 enables the binary values $U^{i+1}_n$ and $R^{i+1}_{n+1}$, to be generated, which correspond to the value of the bit of rank n of the estimation signal $U^{i+1}$ and to the value of the bit of rank n+1 of the correction signal $R^{i+1}_n$ respectively, with 0≤n≤N−1.

In this particular embodiment, the accumulation module 100 consists of a first logic gate of the "OR Exclusive" type, likewise called the "XOR" gate, which is capable of receiving as input a value $U^i_{n-1}$ known as the value of the bit of rank n−1 of the estimation signal $U^i$, obtained during a preceding iteration of index i, and a value $R^i_n$, known as the value of the bit of rank n of a correction signal $R^i$, obtained during a preceding iteration of index i. This first "XOR" gate generates as output an intermediate digital signal 101.

A second "XOR" gate in turn receives the intermediate digital signal 101 and a value $U^i_n$, known as the value of the bit of rank n of an estimation signal $U^i$, obtained during a preceding iteration of index i, and generates as output another intermediate digital signal 102. A third "XOR" gate receives the intermediate digital signal 102 and $c_n$ a value of the bit of rank n of an additional input binary number C to be added, and delivers as output a value $U^{i+1}_n$ known as the value of the bit of rank n of said estimation signal $U^{i+1}$, obtained during an iteration of index i+1.

A third "XOR" gate likewise enables the value and the value of the bit of the additional binary number C to be received as input, and delivers as output an intermediate digital signal 103. An "AND" type logic gate, liked called an "AND" gate, receives the two intermediate signals 102 and 103, and delivers as output a value $R^{i+1}_{n+1}$, known as the value of the bit of rank n+1 of the correction signal $R^{i+1}$, obtained during an iteration of index i+1.

In this way, the value $R^{i+1}_{n+1}$ of the bit of rank n+1 of the correction signal $R^{i+1}$ of index i+1 is determined from the last estimate of the bit $U^i_n$ of rank n, of the last correction bit $R^i_n$ of rank n, from the last estimate of the bit $U^i_{n-1}$ of rank n−1 and from the bit value $c_n$ of rank n of the additional binary number C.

It is important to note that, in the case where the bit in question corresponds to the bit of rank n=0, the bit $U^i_{n-1}$ is considered to be a fictive bit of the estimation signal $U^i$, and the bit $R^i_n$ is a predetermined initialization bit of the correction signal bit $R^i$. Furthermore, if the accumulation step corresponds to an iteration of index 0, then the bit $U^0_{n-1}$ likewise corresponds to a specific initialization value (with n>0) and the bit $U^0_n$ to a specific initialization value of the estimation signal $U^i$.

Consequently, the estimation signals $U^{i+1}$ on N bits and correction signals $R^{i+1}$ on N bits are determined from the following generic equations (1), with $0 \leq n \leq N-1$:

$$\begin{cases} U_n^{i+1} = U_n^i \oplus R_n^i \oplus U_{n-1}^i \oplus c_n \\ R_{n+1}^{i+1} = (U_n^i \oplus R_n^i \oplus U_{n-1}^i) \cdot (U_n^i \oplus c_n) \end{cases} \quad (1)$$

with:

$U^{i+1}_n$: a value of the bit of rank n of the estimation signal $U^{i+1}$, obtained during said iteration of index i+1;

$U^i_n$: a value of the bit of rank n of an estimation signal $U^i$, obtained during a preceding iteration of index i, if i>0, or a specific initialization value $U^0_n$ of the n-position bit of an estimation signal $U^i$ if i=0;

$U^i_{n-1}$: a value of the bit of rank n−1 of the estimation signal $U^i$, obtained during a preceding iteration of index i if n>0 and if i>0, or a specific initialization value $U^0_{n-1}$ of the bit of rank n−1 of the estimation signal $U^i$ if n>0 and if i=0, or a predetermined initialization value of an n−1 position fictive bit of the estimation signal $U^i$ if n=0;

$R^i_n$: a value of the n bit of rank n of a first correction signal $R^i$, obtained during a preceding iteration of index i, if n>0, or a predetermined initialization value of the bit of rank n of the correction signal $R^i$, if n=0;

$R^{i+1}_{n+1}$: a value of the bit of rank n+1 of the correction signal $R^{i+1}$, obtained during the iteration of index i+1;

$C_n$: a value of the bit of rank n of an input binary number C included in said plurality of input binary numbers and taken into account in said addition during the iteration of index i+1 of the accumulation step.

It is clear that other logic architectures (different from that of FIG. 1) can easily be anticipated by a person skilled in the art, in order to implement the generic equations (1), while at the same time remaining within the scope of an embodiment of this invention.

Figure 2:
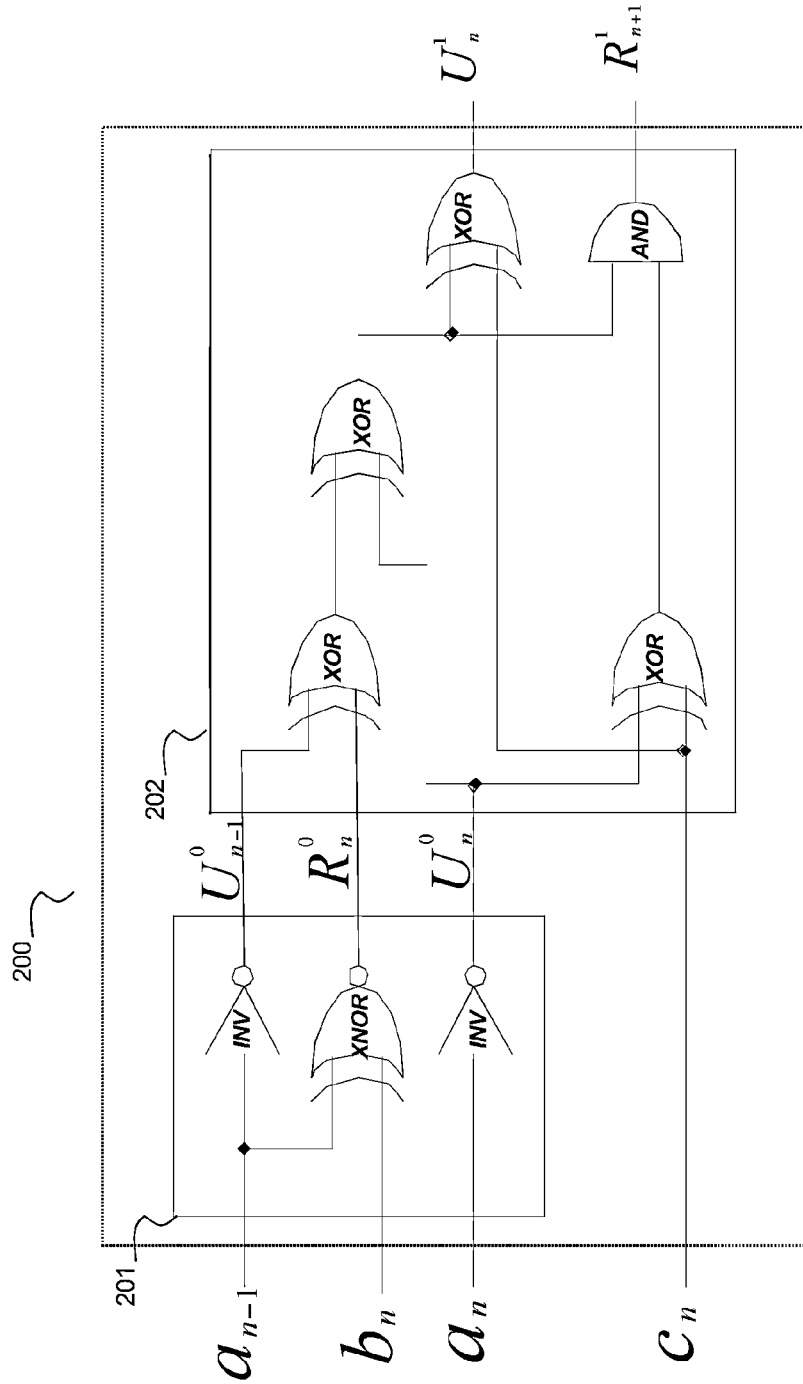
FIG. 2 shows a logic architecture for an initialization module in U/R form, according to a first embodiment of the invention.

A logic architecture will now be presented in connection with FIG. 2, for an initialization module in U/R form, according to a first embodiment of the invention.

More precisely, the initialization module 200 implements the initialization step of the method according to an embodiment of the invention. As a matter of fact, it enables three standard binary numbers A, B and C to be added and to generate an estimation signal $U^i$ on N bits and a correction signal $R^1$ on N bits, corresponding to an iteration of rank 1. These three binary numbers are likewise conventionally expressed on N bits and defined as follows:

$$\begin{cases} A = a_{N-1} \cdot 2^{N-1} + \ldots + a_n \cdot 2^n + \ldots + a_1 \cdot 2^1 + a_0 \cdot 2^0 \\ B = b_{N-1} \cdot 2^{N-1} + \ldots + b_n \cdot 2^n + \ldots + b_1 \cdot 2^1 + b_0 \cdot 2^0 \\ C = c_{N-1} \cdot 2^{N-1} + \ldots + c_n \cdot 2^n + \ldots + c_1 \cdot 2^1 + c_0 \cdot 2^0 \end{cases} \quad (2)$$

with:

$a_n$, $b_n$ and $c_n$ the bit values of rank n of the input binary numbers A, B and C, taken into account in the initialization step, with n varying from 0 to N−1.

The module includes a first sub-module 201, called a pre-computation module, and a second sub-module 202, called an initial accumulation module. More precisely, the pre-computation module 201, as described in the international patent document WO2007122319 (TORNO), introduces a first logic gate of the "Exclusive NOT-OR" type, also called an "XNOR" gate, which is capable of receiving the input bit values $a_{n-1}$, $b_n$, and generating as output an initial correction value $R^0_n$ of the bit of rank n. Two "Inverter" type logic gates, referenced as "INV", which are input with the bit value $a_{n-1}$ and $b_n$, furnish as output an initial estimation value $U^0_{n-1}$ of the bit of rank n−1 and an initial estimation value $U^0_n$ of the bit of rank n.

In this particular embodiment, the pre-computation module 201 is situated upstream from the initial accumulation module. The latter, as described in connection with FIG. 1, enables the value of the bit of rank n of an additional binary number ($c_n$) to be added to the values $U^i_{n-1}$, $R^i_n$ and $U^i_n$. In this specific case, since the iteration is of index 0, the input values of module 202 are therefore $U^0_{n-1}$, $R^0_n$ and $U^0_n$. Since the principle and architecture of module 202 are identical to the accumulation module 100 of FIG. 1, the values obtained as output from the initialization module are therefore incremented by an index having a value of 1.

In the end, the initialization module 200 generates the bit estimation $U^1_n$ and correction $R^1_{n+1}$ values of rank n and n+1, respectively, as defined by the following equations (3):

$$\begin{cases} U_n^1 = \overline{a_n \oplus b_n \oplus c_n} \\ R_{n+1}^1 = \overline{(a_n \oplus b_n)(b_n \oplus c_n)} \end{cases} \quad (3)$$

with $0 \leq n \leq N-1$.

Furthermore, the pre-computation sub-module enables the following equalities to be implemented:

$$U_n^0 = \overline{a_n};$$

$$U_{n-1}^0 = \overline{a_{n-1}};$$

$$R_n^0 = \overline{a_{n-1} \oplus b_n}.$$

By substituting the bit values obtained by the pre-computation sub-module in the generic equations (1) in connection with FIG. 1, the following equations are obtained:

$$\begin{cases} U_n^1 = \overline{a_n} \oplus (\overline{a_{n-1} \oplus b_n}) \oplus \overline{a_{n-1}} \oplus c_n \\ R_{n+1}^1 = (\overline{a_n} \oplus (\overline{a_{n-1} \oplus b_n}) \oplus \overline{a_{n-1}}) \cdot (\overline{a_n} \oplus c_n) \end{cases}$$

Then, by establishing the equality $$(\overline{a_n \oplus b_n}) \cdot (\overline{a_n \oplus c_n}) = (\overline{a_n \oplus b_n}) \cdot (\overline{b_n \oplus c_n}),$$

the aforesaid equalities are simplified, namely:

$$\begin{cases} U_n^1 = \overline{a_n} \oplus b_n \oplus c_n \\ R_{n+1}^1 = (\overline{a_n} \oplus b_n) \cdot (\overline{a_n} \oplus c_n) \end{cases}$$

It is thus noted that the bit value $a_{n-1}$ is no longer part of the aforesaid equation. Consequently, after simplifications, the equations (3) established previously in connection with FIG. 2 are obtained:

$$\begin{cases} U_n^1 = \overline{a_n \oplus b_n \oplus c_n} \\ R_{n+1}^1 = \overline{(a_n \oplus b_n)(b_n \oplus c_n)} \end{cases} \quad (3)$$

$U^1_{-1}$ the bit value of rank n−1 for n=0 of the estimation signal is arbitrarily considered equal to 1 because it is considered to be derived from the equation:

$U^1_{-1} = \overline{a_{-1} \oplus b_{-1} \oplus c_{-1}}$ with: $a_{-1}=0$, $b_{-1}0$, $c_{-1}=0$.

This case remains true irrespective of the iteration of the method.

In the same way, $R^i_0$, the bit value of rank n for n=0 of the correction signal is arbitrarily considered equal to 1 because it is considered to be derived from the equation:

$R_0^1 = \overline{(\overline{a_{-1}} \oplus b_{-1}) \cdot (\overline{b_{-1}} \oplus c_{-1})}$ with: $a_{-1}=0$, $b_{-1}=0$, $c_{-1}=0$.

This case remains true irrespective of the iteration of the method.

Figure 3:
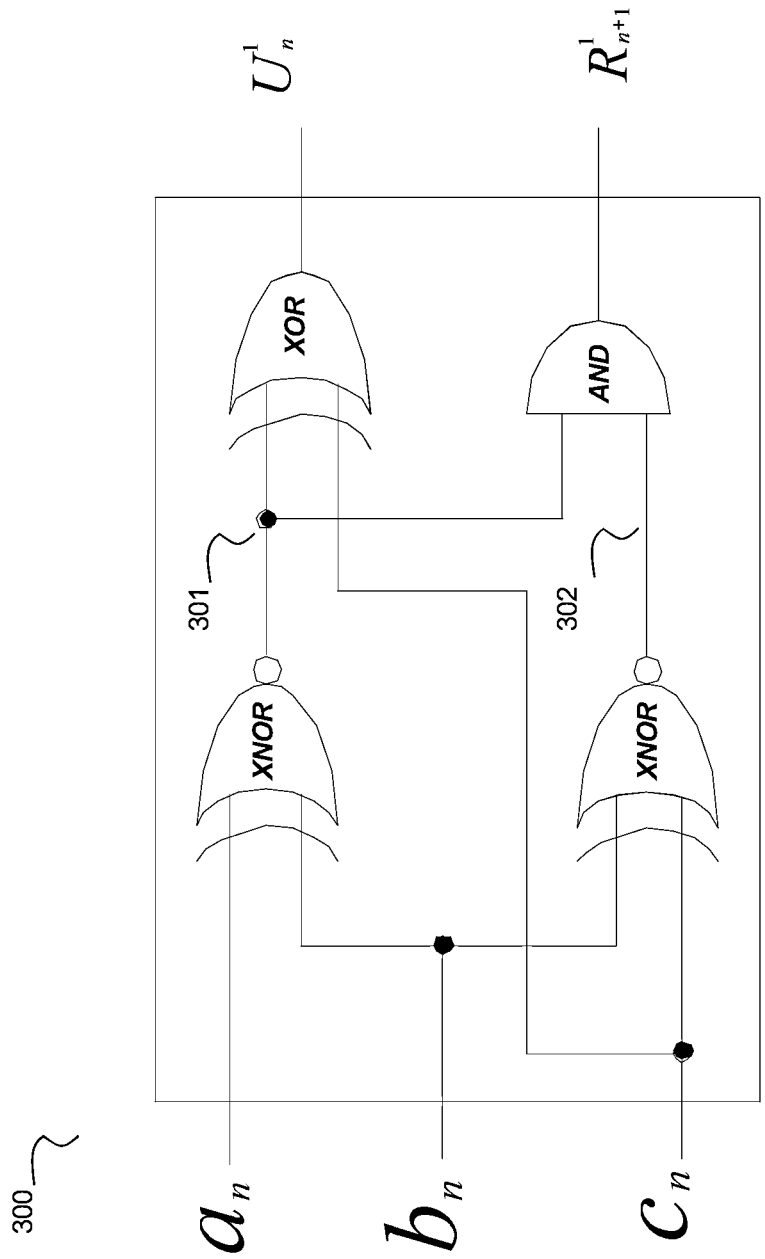
FIG. 3 shows a logic architecture for an initialization module in U/R form, according to a second embodiment of the invention.

An alternative embodiment of the initialization module, in connection with FIG. 3, will now be introduced, as shown in FIG. 2 according to an embodiment of the invention. This alternative, in particular, enables the initialization step of the method to be optimally implemented.

More particularly, the initialization module 300 shown in this figure performs an addition of three bit values $a_n$, $b_n$ and $c_n$ derived from any three input binary numbers A, B, C, and generates as output a value $U^1_n$, known as the value of the bit of rank n of the estimation signal $U^1$ obtained during iteration 1, and a value $R^1_{n+1}$ known as the value of the n bit of rank n+1 of the correction signal $R^1$ obtained during iteration 1.

A first logic gate of the "XNOR" type receives the bit of rank n values of the input binary numbers $a_n$ and $b_n$ and generates as output an intermediate digital signal 301. A logic gate of the "Exclusive OR" type, likewise called "XOR", receives the intermediate signal 301 as well as the bit value of rank n of the third binary number $c_n$, and delivers the n-position value $U^1_n$.

A second logic gate of the "XNOR" type receives the bit values of rank n of the input binary numbers $b_n$ and $c_n$, and generates as output a second intermediate digital signal 302. The "AND" gate receives the two intermediate digital signals 301 and 302, respectively, so as to furnish the value $R^1_{n+1}$ of rank n+1.

It is clear that this alternative likewise enables the initialization step to be implemented, likewise according to the aforesaid equations (3).

Furthermore, it is obvious that other logic architectures (different from that of FIG. 2 or FIG. 3) can easily be anticipated by a person skilled in the art in order to implement the equations (3), while at the same time remaining within the scope of an embodiment of this invention.

An explanation, in the form of equations, of the shift from the prior art to the initialization module in "U/R" form will be found in Appendix 1, and, in Appendix 2, an explanation will be found, in the form of equations, of the shift from the initialization module in "U/R" form to the accumulation module in "U/R" form.

Figure 4:
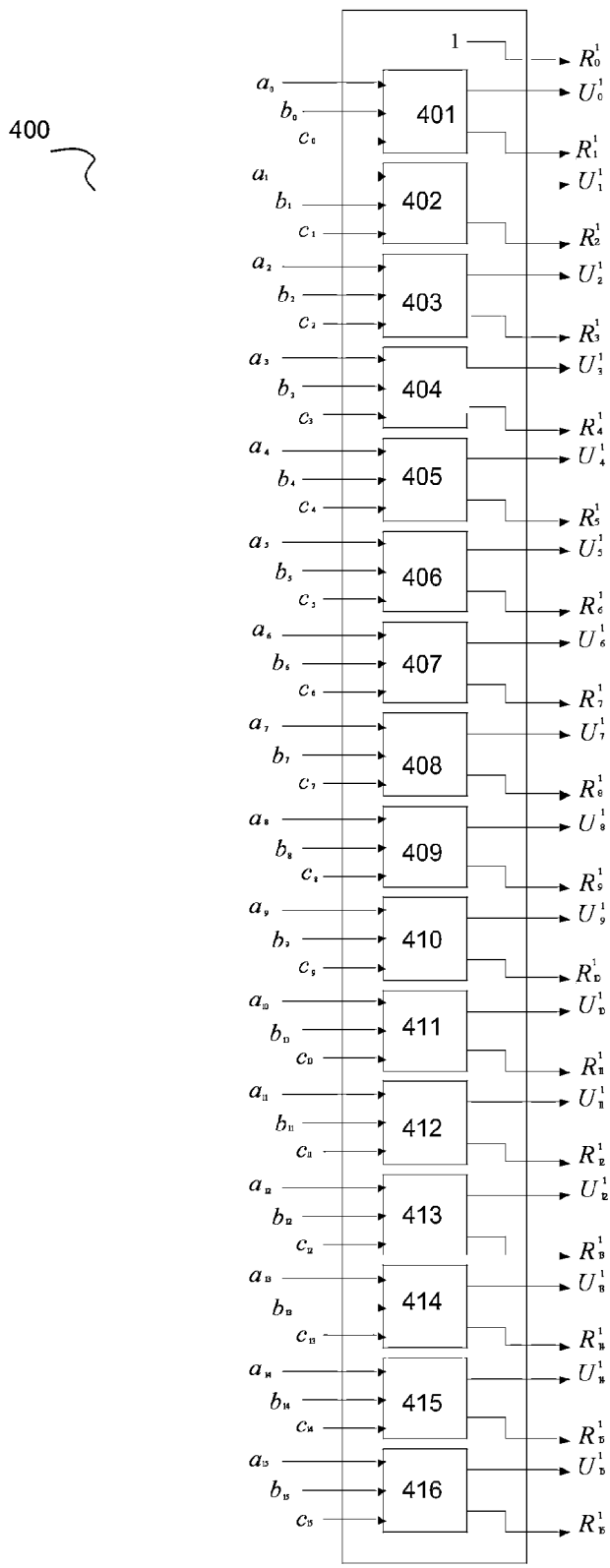
FIG. 4 shows an example of an initialization device in U/R form on 16 bits, according to a particular embodiment of the method of the invention, including 16 initialization modules as shown in FIG. 2 or 3.

An example of an initialization device 400 will now be shown in connection with FIG. 4, which enables three binary numbers expressed on 16 bits to be processed.

More precisely, this involves adding three standard binary numbers A, B and C each defined on 16 bits (N=16). To accomplish this, sixteen initialization modules 401 to 416, as described above in connection with FIG. 2 or FIG. 3, are assembled in parallel, so as to comprise a device 400 for executing the initialization step on 16 bits. For each bit of rank n, an initialization module 401 to 416 receives the bit values of rank n of each of the three binary numbers $a_n$, $b_n$, $c_n$, with n included between 0 and 15. It delivers as output the estimation $U^1_n$ and correction $R^1_{n-1}$ values of bit of rank n and n+1, respectively, according to the equations (3) defined in FIG. 2, and expressed on 16 bits in this example.

In this particular embodiment, it bears noting that, for the bit of rank n=0, the predetermined initialization value corresponding to the correction signal $R^1$ is initialized at 1 because it is not generated due to the fact that the modules do not generate a correction value for a rank n+1.

Figure 5:
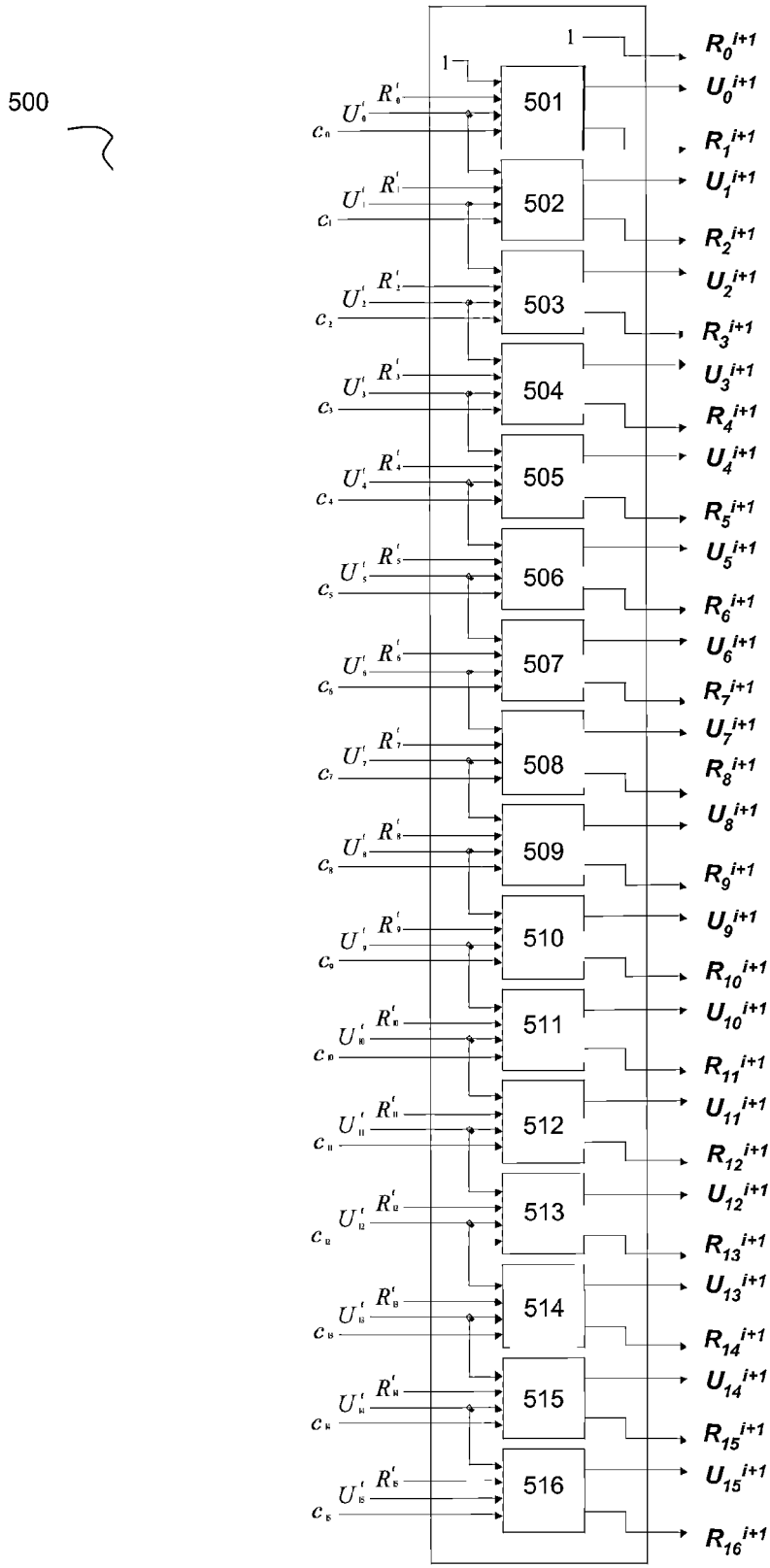
FIG. 5 shows an example of an accumulation device in U/R form on 16 bits, according to a particular embodiment of the invention, including 16 accumulation modules as shown in FIG. 1.

An example of an accumulation device 500, according to the embodiment shown in FIG. 1, will now be introduced in connection with FIG. 5, enabling binary numbers expressed on 16 bits to be processed, and more particularly enabling an additional binary number to be processed.

This involves adding an additional standard binary number C of 16 bits to the estimation $U^i$ and correction $R^i$ signals obtained previously for any iteration of index i, which are likewise expressed on 16 bits. To accomplish this, sixteen accumulation modules 501 to 516, as described above in connection with FIG. 1, are assembled in parallel so as to comprise the device 500 for executing the accumulation phase on 16 bits for a given iteration i. Each accumulation module 501 to 516 (i.e., for each rank n) receives as input the value of the bit $c_n$ of rank n, the value of the bit of rank n of the estimation signal $U^i$, the value of the bit of rank n of the correction signal $R^i$ as well as the value of the value of the bit of preceding rank n−1 of the estimation signal $U^i$, n likewise being included between 0 and 15. Each accumulation module delivers as output the estimation $U^{i+1}_n$ and correction $R^{i+1}_{n+1}$ values of bit of rank n and n+1, respectively, in accordance with the aforesaid equations (1) in connection with FIG. 1, and expressed on 16 bits in this drawing.

Figure 6:
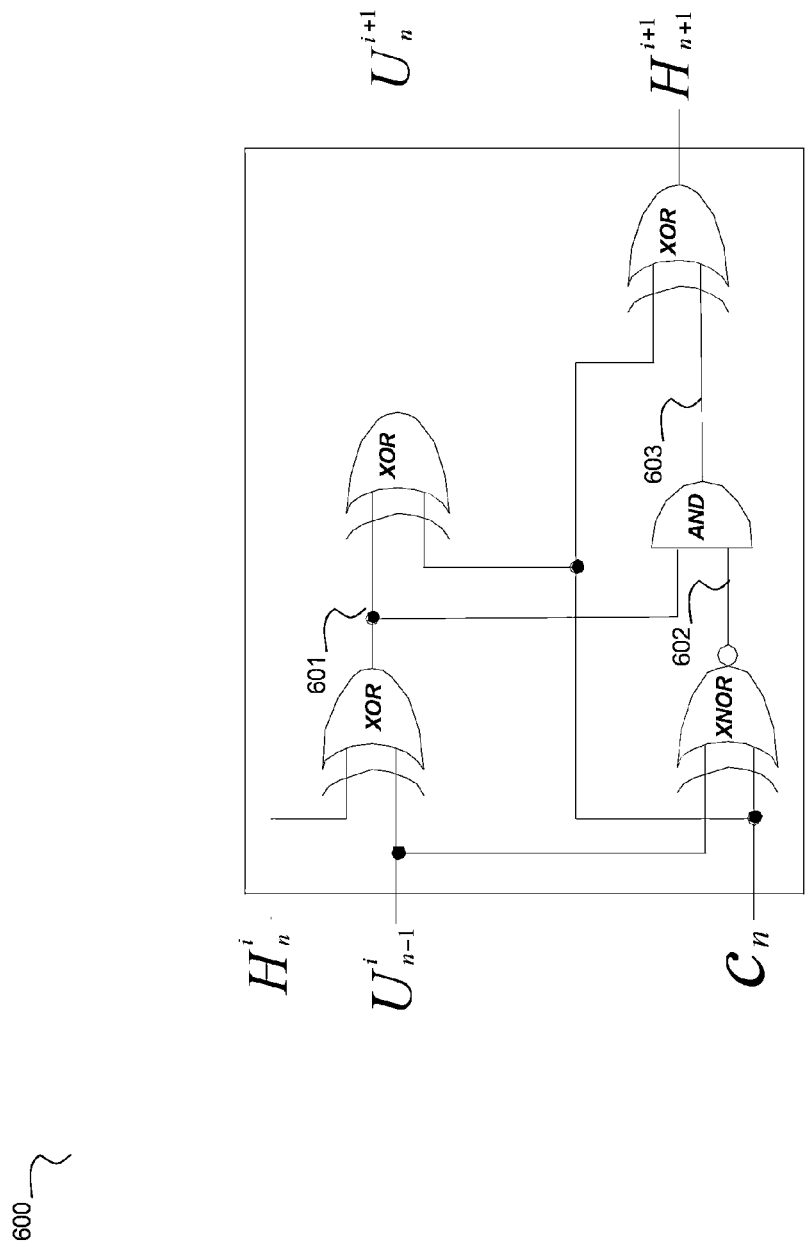
FIG. 6 shows an alternative embodiment, in U/H form, of the accumulation module in U/R form shown in FIG. 1 according to an embodiment of the invention.

Reference is made to FIG. 6 now, which describes an alternative embodiment of the accumulation module shown in FIG. 1 according to the invention, and which likewise implements the accumulation method according to an embodiment of the invention.

As a matter of fact, instead of computing the estimation $U^{i+1}_n$ and correction $R^{i+1}_{n+1}$ values, consideration can be given only to $U^{i+1}_n$ and an intermediate variable referenced as $H^{i+1}_{n+1}$, defined such that:

$H^i_{n+1} = R^1_{n+1} \oplus U^1_n$

Starting with the equations (3) of FIG. 3, enabling the summation of three binary numbers A, B and C, namely:

$$\begin{cases} U_n^1 = \overline{a_n \oplus b_n \oplus c_n} \\ R_{n+1}^1 = \overline{(a_n \oplus b_n)(b_n \oplus c_n)} \end{cases} \quad (3)$$

the following equations are obtained using the equality:

$H_{n+1}^1 = R_{n+1}^1 \oplus U_n^1$:

$$\begin{cases} U_n^1 = \overline{a_n \oplus b_n \oplus c_n} \\ H_{n+1}^1 = \overline{(a_n \oplus b_n)(b_n \oplus c_n)} \oplus \overline{a_n \oplus b_n \oplus c_n} \end{cases},$$

and after simplification:

$$\begin{cases} U_n^1 = \overline{a_n \oplus b_n \oplus c_n} \\ H_{n+1}^1 = \overline{(a_n \oplus b_n)}(b_n \oplus c_n) \oplus c_n \end{cases}$$

The equations (1), for in iteration of index 1, for example, namely:

$$\begin{cases} U_n^1 = U_n^0 \oplus R_n^0 \oplus U_{n-1}^0 \oplus c_n \\ R_{n-1}^1 = (U_n^0 \oplus R_n^0 \oplus U_{n-1}^0) \cdot (U_n^0 \oplus c_n) \end{cases}$$

then become the following equations:

$$\begin{cases} U_n^1 = U_n^0 \oplus R_n^0 \oplus U_{n-1}^0 \oplus c_n \\ H_{n+1}^1 = (U_n^0 \oplus R_n^0 \oplus U_{n-1}^0) \cdot (U_n^0 \oplus c_n) \oplus U_n^0 \oplus R_n^0 \oplus U_{n-1}^0 \oplus c_n \end{cases} \quad (4)$$

$$\begin{cases} U_n^1 = U_n^0 \oplus R_n^0 \oplus U_{n-1}^0 \oplus c_n \\ H_{n+1}^1 = (U_n^0 \oplus R_n^0 \oplus U_{n-1}^0) \cdot (\overline{U_n^0 \oplus c_n}) \oplus c_n \end{cases}$$

Thus, for any iteration of index i, the following generic equations (5) are obtained:

$$\begin{cases} U_n^{i+1} = U_n^i \oplus H_n^i \oplus c_n \\ H_{n+1}^{i+1} = (U_n^i \oplus H_n^i) \cdot (\overline{U_n^i \oplus c_n}) \oplus c_n \end{cases} \quad (5)$$

Based on the same principle as for the accumulation module of FIG. 1, and for a given bit of rank n, this alternative accumulation module 600 enables a standard binary number C to be added to the estimation $U^i$ and correction $H^i$ signals derived from an iteration i and to once again provide a result in redundant binary form, namely an iteration of index i+1 estimation $U^{i+1}$ and correction $H^{i+1}$ signal.

According to this alternative accumulation module architecture, it is possible to generate as output from the module 600, a value of the bit of rank not the estimation signal $U^{i+1}$ and a value of the bit of rank n+1 of the correction signal $H^{i+1}$ from the following values obtained during a preceding iteration of index i of the accumulation step: $U^i_{n-1}$ a value of the bit of rank n−1 of an estimation signal $U^i$, $H^i_n$ a value of the bit of rank n of the correction signal $H^i$ and $c_n$ the value of the bit of rank n of a standard binary number C.

More precisely, the values $U^i_{n-1}$ and $H^i_n$ derived from the preceding iteration i, are received by a first logic gate of the "Exclusive OR" type, also called an "XOR" gate, providing an intermediate digital signal 601. A second "XOR" gate in turn receives the intermediate digital signal 601 and the bit value $c_n$ of the additional binary number C, and generates as output the value $U^{i+1}_n$, known as the value of the bit of rank n of the estimation signal $U^{i+1}$, obtained during an iteration of index i+1.

The values $U^i_{n-1}$ and $c_n$ are received as input by an "XNOR" gate and deliver as output an intermediate digital signal 602. An "AND" type logic gate next receives the two intermediate signals 601 and 602 and in order to deliver an intermediate digital signal 603. Finally, the third "XOR" gate receives the intermediate signal 603 and the value $c_n$ of the binary number C, and delivers the value $H^{i+1}_{n+1}$, known as the value of the bit of rank n+1 of the correction signal $H^{i+1}$ obtained during said iteration of index i+1.

Consequently, the estimated bits $U^{i+1}_n$ and the corrected bits $H^{i+1}_{n+1}$ obtained during an iteration of index i+1 are determined from the following generic equations (5):

$$\begin{cases} U_n^{i+1} = U_n^i \oplus H_n^i \oplus c_n \\ H_{n+1}^{i+1} = (U_n^i \oplus H_n^i) \cdot (\overline{U_n^i \oplus c_n}) \oplus c_n \end{cases} \quad (5)$$

with:
$U^{i+1}_n$: a value of the n bit of rank n of the estimation signal $U^{i+1}$, with 0≤n≤N−1, obtained during an iteration of index i+1;
$U^i_n$: a value of the bit of rank n of the estimation signal $U^i$, obtained during a preceding iteration of index i if i>0, or a specific initialization value $U^0_n$ of the bit of rank n of an estimation signal $U^i$ if i=0;
$U^i_{n-1}$: a value of the bit of rank n−1 of said estimation signal obtained during a preceding iteration of index i, if n>0 and if i>0,
  or specific initialization value $U^0_{n-1}$ of the bit of rank n−1 of said estimation signal $U^i$, if n>0 and if i=0,
  or a predetermined initialization value of an fictive bit of rank n−1 of said estimation signal $U^i$ if n=0;
$H^i_n$: a value of the bit of rank n of a second correction signal $H^i$, obtained during the preceding iteration of index i;
$H^{i+1}_{n+1}$: a value of the bit of rank n+1 of said second correction signal $H^{i+1}$, obtained during the iteration of index i+1;
$c_n$: a value of the bit of rank n of an input binary number C included in said plurality of input binary numbers and taken into account in the addition, during the iteration of index i+1 of the accumulation step.

It is clear that other logic architectures (different from that of FIG. 6) can easily be anticipated by a person skilled in the art in order to implement the generic equations (5), while at the same time remaining within the scope of an embodiment of this invention.

Figure 7:
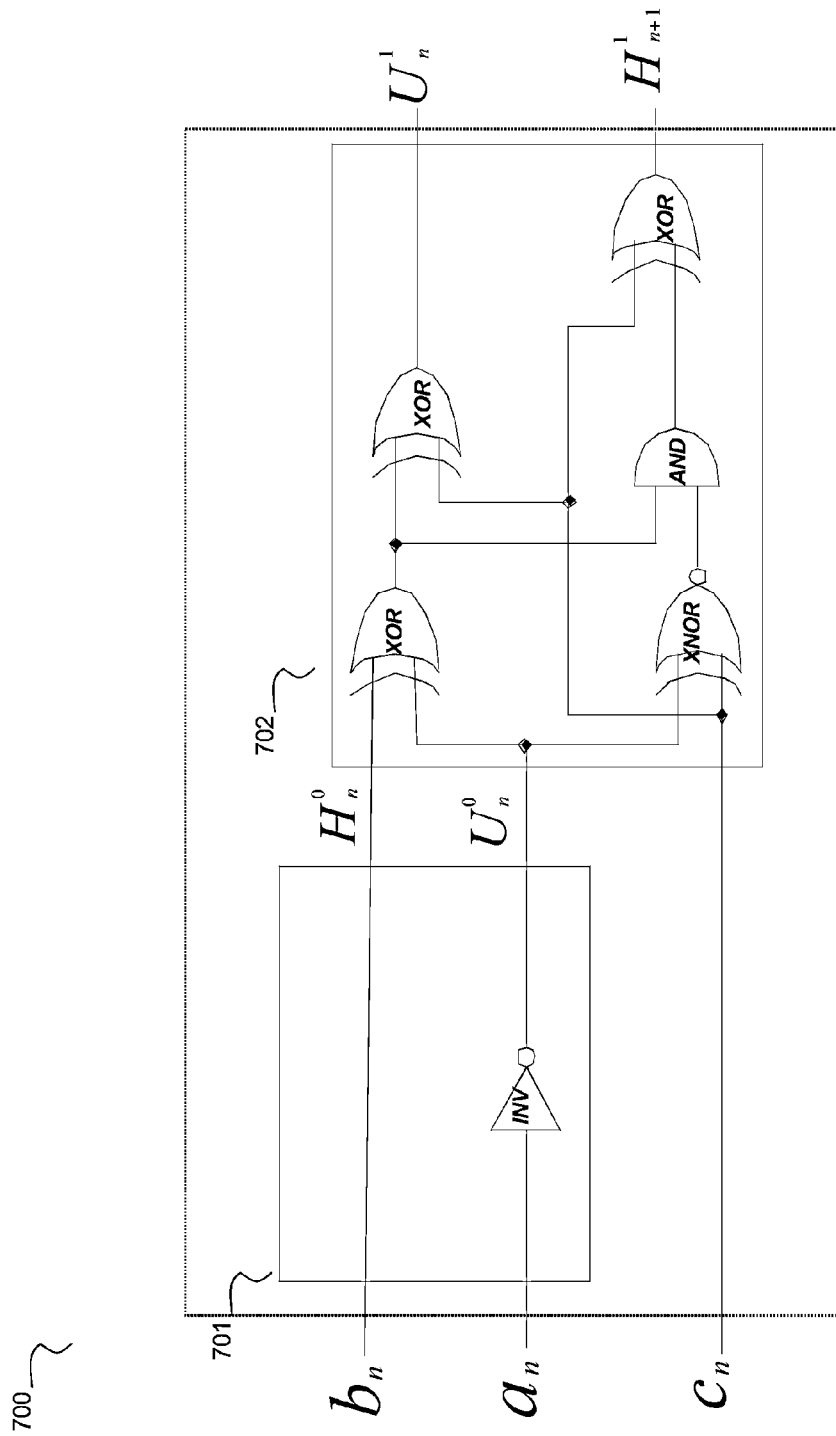
FIG. 7 shows a logic architecture for an initialization module in U/H form, according to a first embodiment of the invention.

An logic architecture 700 will now be introduced in connection with FIG. 7, for an initialization module which is capable of being implemented by the alternative embodiment of FIG. 6 of an initialization module according to a particular embodiment implementing the initialization step of the method according to an embodiment of the invention.

The initialization module 700 includes a first sub-module 701, called a pre-computation module, and a second sub-module 702, called an initial accumulation module. More precisely, the pre-computation module 701, unlike the initialization module 200 of FIG. 2, has a single logic gate of the "INV" type, which is capable of receiving the bit value of rank n of inputs $a_n$ generating as output an initial bit value $U^0_n$ of rank n. As a matter of fact, by returning to the equations (4) and by establishing the following equalities for the pre-computation module 701, namely:

$H_n^0 = R_n^0 \oplus U_{n-1}^0$ with $U_{n-1}^0 = \overline{a_{n-1}}$ and $R_n^0 = \overline{a_{n-1} \oplus b_n}$, the equations for the pre-computation module can be simplified: $H_n^0 = b_n$ and $U_n^0 = \overline{a_n}$.

In this architecture, the pre-computation module 701 is situated upstream from the initial accumulation module 702. The latter, as described in FIG. 6, enables the bit value of rank n of an additional binary number referenced as $c_n$ to be added to the estimation $U^i_{n-1}$ and correction $H^i_n$ bit values of rank n−1 and n, respectively. Since the iteration is of index 0, the input values of the module 702 are therefore $U^0_{n-1}$ and $H^0_n$.

Furthermore, since the principle and architecture of module 702 are identical to the accumulation module 600 of FIG. 6, the values obtained as output from initialization module are therefore incremented by an index having a value of 1. In this way, the estimation $U^1_n$, and correction $H^i_{n+1}$ values are obtained for the n and bit of rank n+1, respectively, as defined by the following equations:

$$\begin{cases} U^1_n = U^0_n \oplus R^0_n \oplus U^0_{n-1} \oplus c_n \\ H^1_{n+1} = (U^0_n \oplus R^0_n \oplus U^0_{n-1}) \cdot \overline{(U^0_n \oplus c_n)} \oplus c_n. \end{cases}$$

Accordingly, module 700 enables the following equations to be implemented:

$$\begin{cases} U^1_n = \overline{a_n \oplus b_n \oplus c_n} \\ H^1_{n+1} = \overline{(a_n \oplus b_n)}(b_n \oplus c_n) \oplus c_n \end{cases} \quad (6)$$

It is clear that other logic architectures (different from that of FIG. 7) can easily be anticipated by a person skilled in the art, in order to implement the equations (6), while at the same time remaining with the scope of an embodiment of this invention.

Figure 8:
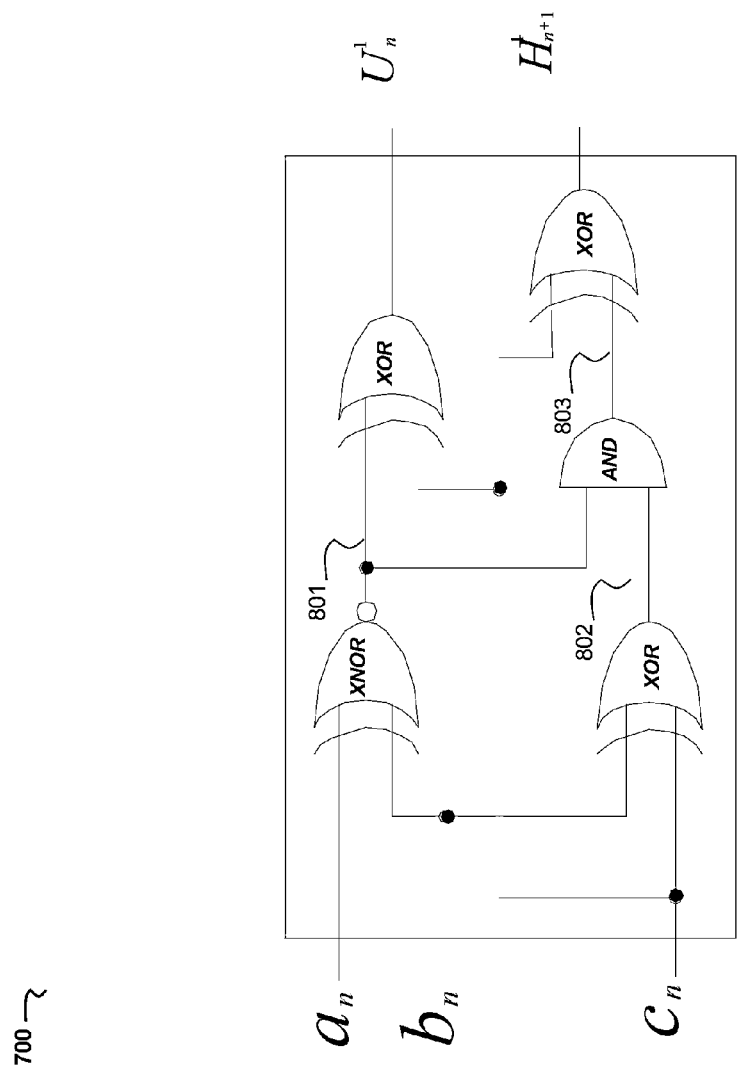
FIG. 8 shows a logic architecture for an initialization module in U/H form according to a second embodiment of the invention.

Reference will now be made to FIG. 8, which describes an alternative embodiment of the initialization module shown in FIG. 7. This alternative is considered to enable optimal implementation of the initialization step of the method.

More particularly, the initialization module 800 shown in this figure adds three bit values $a_n$, $b_n$ and $c_n$, derived from any three input binary numbers A, B, C. As output, it generates a value $U^1_n$ known as the bit value of rank n of the estimation signal $U^1$ obtained during iteration 1, and a value $R^1_{n+1}$ known as the bit value of rank n+1 of the correction signal $R^1$, likewise obtained during iteration 1.

To accomplish this, a first logic gate of the "XNOR" type receives the bit values of rank n of the input binary numbers $a_n$ and $b_n$, and generates, as output, an intermediate digital signal 801. A logic gate of the "XOR" type receives the intermediate signal 801 as well as the bit value of rank n of the third binary number $c_n$, and delivers the bit value $U^1_n$ of rank n identically to the initialization module 300 of FIG. 3.

Furthermore, a second logic gate of the "XOR" type receives the bit values of rank n $b_n$ and $c_n$ and generates as output a second intermediate digital signal 802. The "AND" gate receives the two intermediate digital signals, 801 and 802, respectively, and generates a third intermediate signal 803. The latter is used with the value $c_n$, by means of a third "XOR" gate so as to provide the value $H^1_{n+1}$ of rank n+1.

Figure 9:
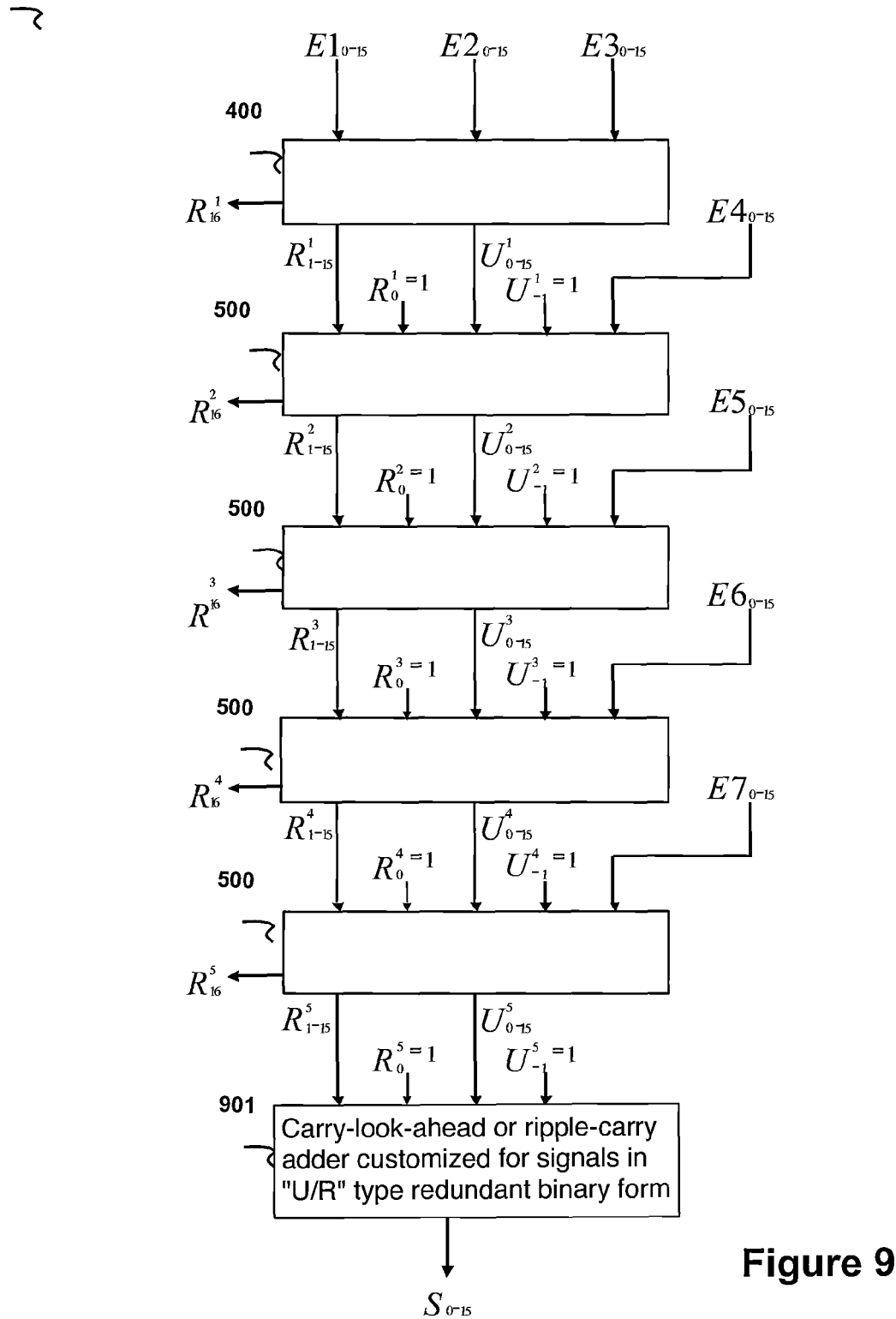
FIG. 9 shows a block diagram of a parallel multi-operand adder according to a particular embodiment of the method according to the invention.

A block diagram of a parallel multi-operand adder according to a particular embodiment in accordance with the invention will now be presented in connection with FIG. 9. More precisely, this adder adds seven binary numbers, referenced as E1 to E7, each binary number being expressed on 16 bits.

In this particular embodiment, a first computation stage is introduced, which consists of the initialization device 400, as described above in connection with FIG. 3, which computes the sum of three binary numbers E1, E2 and E3, and enables the two estimation $U^1_{0-15}$ and correction $R^1_{1-15}$ signals, of iteration i=1, represented in a "U/R" type redundant form, to be provided as output.

A second computation stage consisting of the accumulation device 500, as described above in connection with FIG. 5, receives, as input, the estimation $U^1_{0-15}$ and correction $R^1_{1-15}$ signals derived from the preceding device 400 (i=1) and an additional binary number E4 on 16 bits. This second stage generates, as output, two estimation $U^2_{0-15}$ and correction $R^2_{1-15}$ signals, of index iteration 2, and likewise represented in a "U/R" type redundant form. In the same way, three other stages 500 are added so as to be capable of adding, at each computation stage (i.e., at each iteration of index i), one of the three remaining additional binary numbers, namely E5 (for the iteration of index 3), E6 (for the iteration if index 4) and E7 (for the iteration of index 5).

In the end, the last estimation $U^5_{0-15}$ and correction $R^5_{1-15}$ signals derived from last stage (iteration of index 5) are received by a "Carry-Look-Ahead" or "Ripple-Carry" type adder 901 customized so as to obtain the result $S_{0-15}$ of the seven binary numbers added, in standard binary form, from the signals represented in a "U/R" type redundant binary form. The computation details concerning this final sum are described in the international patent WO2007122318 (TORNO).

It is to be noted that the values $R^i_0$ and $U^i_{-1}$ are the predetermined bit of rank n=0 of the correction signal and specific initialization values which, in this specific case, are equal to 1. As a matter of fact, since each module generates a correction signal $R^i_{n+1}$ of rank n+1 for an iteration of index i, the correction signal of rank n=0 and of iteration i is therefore non-existent. The same is true for the fictive bit $U^i_{-1}$.

Furthermore, it is to be noted that the bit values of rank 16, referenced as $R^i_{16}$, are not used in this particular embodiment. As a matter of fact, the dynamics of expressing on 16 bits are sufficient for the accumulation of the seven binary numbers to be capable of being carried out without any overflow.

Figure 10:
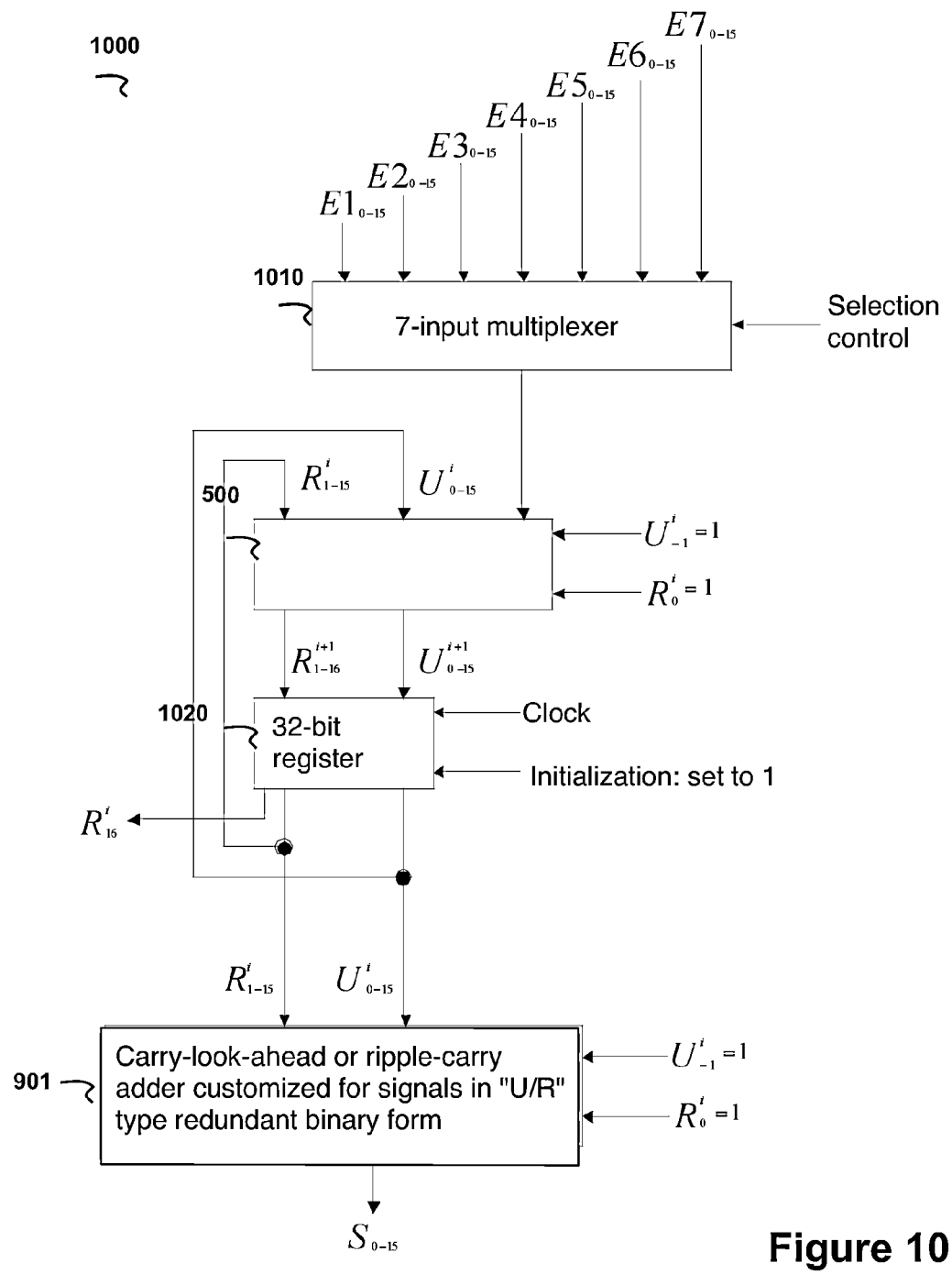
FIG. 10 shows a block diagram of a sequential multi-operand adder according to a particular embodiment of the method according to the invention.

A block diagram of a sequential multi-operand adder according to a particular embodiment in accordance with the invention will now be introduced in connection with FIG. 10. More particularly, this adder adds seven binary numbers, referenced as E1 to E7, of 16 bits each. It can be used, in particular, within the framework, of digital filtering, for example.

In this particular embodiment, a single accumulation device 500 is required (as described in FIG. 5), and a register 1020 stores all of the intermediate accumulation results. The computation is done sequentially for i iterations, with i varying from 1 to 7.

In a first phase, the register 1030 containing signals $U^0_{0-15}$ and the correction signals $R^0_{1-15}$ is initialized so that each n bit value $U^0_{0-15}$ and $R^0_{1-16}$ has the value of 1, as well as $U^0_{-1}$, and $R^0_0$.

In a second phase, the selection control for the multiplexer 1010 selects the input binary number E1 and a computation of index 1 (i+1 with i=0), which is then carried out. The accumulation device 500, consisting of 16 accumulation modules, adds the inputs $U^1_{0-15}$, $R^1_{1-16}$ on 16 bits and E1 in order to generate the values $U^1_{0-15}$ and $R^1_{1-16}$. The previously obtained values are then input into the 32-bit register and stored by the action of the clock. Then, the selection control of the multiplexer selects the next input E2.

It is to be noted that the values $U^1_{-1}$ and $R^1_0$ are always equal to 1 irrespective of the accumulation computation step, in other words, irrespective of the iteration value i.

The actions of the preceding step are then repeated for i, ranging from 2 to 7, so as to be capable of adding all the inputs E2 to E7 to the intermediate results $U^1_{0-15}$ and $R^1_{1-16}$ to $U^6_{0-15}$ and $R^6_{1-16}$ to obtain the intermediate results $U^2_{0-15}$ and $R^2_{1-16}$ to $U^7_{0-15}$ and $R^7_{1-16}$.

Finally, a final computation is carried out by means of an adder. The intermediate result $U^7_{0-15}$ and $R^7_{1-15}$ corresponding to the last iteration (i=7) is input into an adder 901 of the "Carry-Look-Ahead" type or "Ripple-Carry" type, on 16 bits, which is adapted to receive as input a "U/R" redundant binary form, as described in the international patent WO2007122319 (TORNO). The bits $U^7_{-1}$ and $R^7_0$ are initialized at 1. The adder 901 thus enables determination of the final result, in standard binary form, of the sum of the seven binary numbers E1 to E7.

It is to be noted that the bit values of rank 16, referenced as $R^i_{16}$, are not likewise used in this particular embodiment. As a matter of fact, the expression dynamics on 16 bits is sufficient for the accumulation of the seven binary numbers to be capable of being carried out without any overflow.

FIG. 11 shows an example of digital computation of a summation of seven binary numbers, carried out by the multi-operand adder of FIG. 9. Each computation line is expressed on 16 bits of data and each estimation U and correction R signal is shown for each of the iterations of the method in accordance with an embodiment of the invention.

The final binary result S is likewise presented on 16 bits of data, the latter having been obtained in standard binary form.

It shall be noted that the invention is not limited to a purely hardware implementation, but that it can also be implemented in the form of a sequence of computer program instructions or any form combining a hardware portion and a software portion. In the case where the invention is partially or completely implemented in software form, the corresponding sequence of instructions may or may not be stored in a removable storage means (e.g., such as a diskette, a CD-ROM or a DVD-ROM), this storage means being partially or entirely readable by a computer or microprocessor.

At least one embodiment of the disclosure provides a technique for adding binary numbers using a "U/R" type redundant binary representation (thereby enabling the carry digits from being propagating onto intermediate computation results), which offers better performance levels than the aforesaid known technique described in the international application WO2007122319.

An embodiment likewise providing such a technique which enables more than two binary numbers to be summed.

An embodiment provides such a technique which enables the execution time for adding multiple binary numbers to be reduced. More precisely, one objective is to reduce the propagation time.

An embodiment provides such a technique enabling the number of logic gates required by the adder to be reduced so as to gain compactness and reduce the energy consumption thereof.

An embodiment provides such a technique which introduces improved testability, due, in particular, to a particular layout of "Exclusive OR" (EXOR) and "AND" gates.

An embodiment provides such a technique which facilitates the implementation of burn-in of the parity-check computations.

An embodiment provides such a technique which is simple to implement and inexpensive.

1. APPENDIX 1

Shift from the Prior Art to the Initialization Module in "U/R" Form

Given A, B and C as the three numbers that one wished to add, and which are expressed on N bits:

$$\begin{cases} A = a_{N-1} \cdot 2^{N-1} + \ldots + a_n \cdot 2^n + \ldots + a_1 \cdot 2^1 + a_0 \cdot 2^0 \\ B = b_{N-1} \cdot 2^{N-1} + \ldots + b_n \cdot 2^n + \ldots + b_1 \cdot 2^1 + b_0 \cdot 2^0 \\ C = c_{N-1} \cdot 2^{N-1} + \ldots + c_n \cdot 2^n + \ldots + c_1 \cdot 2^1 + c_0 \cdot 2^0 \end{cases}$$

It is conventionally possible, in a first phase, to sum these three binary numbers and to obtain a result of the standard "Carry-Save" form by means of a network of "full-adder" type adders. This network of adders enables a partial sum and a partial carry-over to be generated as output, such that:

$$\begin{cases} S_n = a_n \oplus b_n \oplus c_n \\ Cy_{n+1} = a_n \cdot b_n \oplus c_n \cdot (a_n \oplus b_n) \end{cases}$$

with:
$S_n$ the partial sum in n, and
$Cy_{n+1}$ the partial carry=–over in (n+1).

In order to obtain a representation in the "U/R" form non-obviously, the partial sum and the partial carry-over are considered to be 2 binary numbers to be added and the so-called initial estimation method described in the document WO2007122319 is described.

In this way, the following numbers U and R are obtained:

$$\begin{cases} U_n = \overline{S_n} \\ R_{n+1} = \overline{Cy_{n+1} \oplus S_n} \end{cases}$$

By substituting the values for $S_n$ and $Cy_{n+1}$ with the expressions thereof as $a_n$, $b_n$, $c_n$, one obtains:

$$\begin{cases} U_n = \overline{a_n \oplus b_n \oplus c_n} \\ R_{n+1} = \overline{a_n \cdot b_n \oplus c_n \cdot (a_n \oplus b_n) \oplus \overline{a_n \oplus b_n \oplus c_n}} \end{cases}$$

After expansion, the following two expressions are obtained:

$$\begin{cases} U_n = \overline{a_n \oplus b_n \oplus c_n} \\ R_{n+1} = \overline{(a_n \oplus \overline{b_n}) \cdot b_n \oplus \overline{c_n} \cdot (a_n \oplus b_n) \oplus \overline{c_n}} \end{cases}$$

and after factorization, the following equations (3) implemented by the mechanism of this invention are obtained, namely:

$$\begin{cases} U_n = \overline{a_n \oplus b_n \oplus c_n} \\ R_{n+1} = \overline{(a_n \oplus b_n)} \cdot \overline{(b_n \oplus c_n)} \end{cases} \quad (3)$$

2. APPENDIX 2

Shift from the Initialization Module in "U/R" Form to the Accumulation Module in "U/R" Form Starting with the same equations as previously, it is possible to construct an accumulation module enabling an estimation signal U, a correction signal R and a standard binary number c to be received as input. The computation details enabling determination of the result in "U/R" redundant form are set forth hereinbelow.

Starting with the aforesaid equations (3), it is possible, for example, to construct an initial form expressed in the following way from binary numbers A and B:

$$\begin{cases} U_n^0 = \overline{a_n} \\ R_{n+1}^0 = \overline{a_n \oplus b_{n+1}} \end{cases} \text{ and } \begin{cases} U_{n-1}^0 = \overline{a_{n-1}} \\ R_n^0 = \overline{a_{n-1} \oplus b_n} \end{cases}$$

The values $a_n$ and $b_n$ can then be deduced, namely:

$$\begin{cases} a_n = \overline{U_n^0} \\ b_n = R_n^0 \oplus U_{n-1}^0 \end{cases}$$

Then, by substituting the values of $a_n$ and $b_n$ in the system of equations (1), the following expression is obtained:

$$\begin{cases} U_n^1 = \overline{U_n^0} \oplus (R_n^0 \oplus U_{n-1}^0) \oplus \overline{c_n} \\ R_{n+1}^1 = \overline{(U_n^0 \oplus (R_n^0 \oplus U_{n-1}^0))} \cdot ((R_n^0 \oplus U_{n-1}^0) \oplus \overline{c_n}) \end{cases}$$

After expansion and simplification, the two following expressions are obtained:

$$\begin{cases} U_n^1 = U_n^0 \oplus R_n^0 \oplus U_{n-1}^0 \oplus c_n \\ R_{n+1}^1 = (U_n^0 \oplus R_n^0 \oplus U_{n-1}^0) \cdot (U_n^0 \oplus c_n) \end{cases}$$

If the computation is no longer generalized at index 1 but rather at index i+1, then, accordingly, for any index i+1, the following generic equations (1) are obtained:

$$\begin{cases} U_n^{i+1} = U_n^i \oplus R_n^i \oplus U_{n-1}^i \oplus c_n \\ R_{n+1}^{i+1} = (U_n^i \oplus R_n^i \oplus U_{n-1}^i) \cdot (U_n^i \oplus c_n) \end{cases} \quad (1)$$

Although the present disclosure has been described with reference to one or more examples, workers skilled in the art will recognize that changes may be made in form and detail without departing from the scope of the disclosure and/or the appended claims.

The invention claimed is:

1. An addition device for adding a plurality of input binary numbers each represented by a digital signal of N bits, wherein the device comprises:
   inputs configured to receive the digital signals representing the plurality of input binary numbers;
   at least one accumulation device configured to carry out, each time that it is activated, one iteration, of index i+1 with i≥0, of an accumulation mechanism, each accumulation device comprising estimation means selected from the group consisting of:
   first estimation means for generating an estimation signal $U^{i+1}$ on N bits, and first correction means for generating a first correction signal $R^{i+1}$ on N bits, said first estimation means and said first correction means comprising means for implementing the following first set of equations:

$$\begin{cases} U_n^{i+1} = U_n^i \oplus R_n^i \oplus U_{n-1}^i \oplus c_n \\ R_{n+1}^{i+1} = (U_n^i \oplus R_n^i \oplus U_{n-1}^i) \cdot (U_n^i \oplus c_n) \end{cases}$$

and second estimation means for generating an estimation signal $U^{i+1}$ on N bits, and second correction means for generating a second correction signal $H^{i+1}$ on N bits, said second estimation means and said second correction means comprising means for implementing the following second set of equations:

$$\begin{cases} U_n^{i+1} = U_n^i \oplus H_n^i \oplus c_n \\ H_{n+1}^{i+1} = (U_n^i \oplus H_n^i) \cdot \overline{(U_n^i \oplus c_n)} \oplus c_n \end{cases}$$

with:
$U^{i+1}_n$: value of the bit of rank n of said estimation signal $U^{i+1}$, with 0≤n≤N−1, obtained during said iteration of index i+1;
$U^i_n$: a value of the bit of rank n of an estimation signal $U^i$, obtained during a preceding iteration of index i if i>0, or a determined initialization value $U^0_n$ of the bit of rank n of an estimation signal $U^i$ if i=0;
$U^i_{n-1}$: a value of the bit of rank n−1 of said estimation signal $U^i$, obtained during a preceding iteration of index i if n>0 and if i>0,
   or a determined initialization value $U^0_{n-1}$ of the bit of rank n−1 of said estimation signal $U^i$ if n>0 and if i=0;
   or a predetermined initialization value of an fictive bit of rank n−1 of said estimation signal $U^i$ if n=0;
$R^i_n$: a value of the bit of rank n of a first correction signal $R^i$, obtained during a preceding iteration of index i if n>0,
   or a predetermined initialization value of the bit of rank n of said first correction signal $R^i$ if n=0;
$R^{i+1}_{n+1}$: a value of the bit of rank n+1 of said first correction signal $R^{i+1}$, obtained during said iteration of index i+1;
$H^i_n$: a value of the bit of rank n of a second correction signal $H^i$, obtained during a preceding iteration of index i;
$H^{i+1}_{n+1}$: a value of the bit of rank n+1 of said second correction signal $H^{i+1}$, obtained during said iteration of index i+1;
$C_n$: a value of the bit of rank n of an input binary number C included in said plurality of input binary numbers and taken into account in said addition during said iteration of index i+1, the estimation signal $U^i$ and the first correction signal $R^i$ or the second correction signal $H^i$ representing a sum of at least two binary numbers of the plurality of input binary numbers in redundant form, the estimation signal $U^{i+1}$ and the first correction signal $R^{i+1}$ or the second correction signal $H^{i+1}$, representing the sum of said at least two binary numbers in redundant form and of the binary number c, wherein the last iteration of $U_n$ is the sum $S_n$ of the bit of rank n.

2. The addition device of claim 1, wherein said accumulation device comprises, for each bit n, an accumulation sub-unit comprising:
   a first XOR logic gate receiving said value $U^i_{n-1}$ of the bit of rank n and of index i and said value $R^i_n$ of the bit of rank n and of index i, and generating a first intermediate signal;
   a second XOR logic gate receiving said first intermediate signal and said value $U^i_n$ of the bit of rank n and of index i, and generating a second intermediate signal;
   a third XOR logic gate receiving said second intermediate signal and said value of the bit of rank n of an input binary number C, and generating said value $U^{i+1}{}_n$ of the bit of rank n of said estimation signal $U^{i+1}$ for the iteration of index i+1;

a fourth XOR logic gate receiving said value $U^i{}_n$ of the bit of rank n and of index i and said value $c_n$ of the bit of rank n of an input binary number C, and generating a third intermediate signal; and an AND logic gate receiving said third intermediate signal and said second intermediate signal, and generating said value $R^{i+1}{}_{n+1}$ of the bit of rank n+1 of said first correction signal $R^{i+1}$ for the iteration of index i+1.

3. The addition device of claim 1, wherein said accumulation device comprises, for each bit n, an accumulation sub-unit comprising:

a first XOR logic gate receiving said value $U^i{}_{n-1}$ of the bit of rank n−1 and of index i and said value $H^i{}_n$ of the bit of rank n and of index i, and generating a first intermediate signal;

a second XOR logic gate receiving said first intermediate signal and said value $c_n$ of the bit of rank n of an input binary number C, and generating said value $U^{i+1}{}_n$ of the bit of rank n of said estimation signal $U^{i+1}$ for the iteration of index i+1;

an XNOR logic gate receiving said value $U^i{}_{n-1}$ of the bit of rank n−1 and of index i and said value $c_n$ of the bit of rank n of an input binary number C and generating a second intermediate signal;

an AND logic gate receiving said first intermediate signal and said second intermediate signal and generating a third intermediate signal; and a third XOR logic gate receiving said third intermediate signal and said value $c_n$ of the bit of rank n of an input binary number C and generating said value $H^{i+1}{}_{n+1}$ of the bit of rank n+1 of said second correction signal $H^{i+1}$ for the iteration of index i+1.

4. The addition device of claim 1, wherein the addition device includes an initialization unit comprising estimation means selected from the group consisting of:

third estimation means for generating an estimation signal $U^1$ on N bits, and third correction means for generating a third correction signal $R^1$ on N bits, said third estimation means and said third correction means comprising means for implementing the following third set of equations, with $0 \leq n \leq N-1$:

$$\begin{cases} U_n^1 = \overline{a_n \oplus b_n \oplus c_n} \\ R_{n+1}^1 = \overline{(a_n \oplus b_n)}(b_n \oplus c_n) \end{cases}$$

and fourth estimation means for generating an estimation signal $U^1$ on N bits, and fourth correction means for generating a fourth correction signal $H^1$ on N bits, said fourth estimation means and said fourth correction means comprising means for implementing the following fourth set of equations, with $0 \leq n \leq N-1$:

$$\begin{cases} U_n^1 = \overline{a_n \oplus b_n \oplus c_n} \\ R_{n+1}^1 = \overline{(a_n \oplus b_n)}(b_n \oplus c_n) \oplus c_n \end{cases}$$

with:

$a_n$: a value of the bit of rank n of an input binary number A included in said plurality of input binary numbers and taken into account by said initialization unit;

$b_n$: a value of the bit of rank n of an input binary number B included in said plurality of input binary numbers and taken into account by said initialization unit;

$c_n$: a value of the bit of rank n of an input binary number C included in said plurality of input binary numbers and taken into account by said initialization unit;

and wherein said initialization unit replaces the accumulation unit, enabling the iteration of index 1 to be carried out.

5. The addition device of claim 4, wherein said initialization unit comprises, for each bit n, an initialization sub-unit comprising:

a first XNOR logic gate receiving said value $a_n$ of the bit of rank n of an input binary number A and of the said $b_n$ value of the bit of rank n of an input binary number B and generating a first intermediate signal;

an XOR logic gate receiving said first intermediate signal and said value said value $c_n$ of the bit of rank n of an input binary number C and generating said value $U^1{}_n$ of the bit of rank n of said estimation signal $U^1$ for the iteration of index 1;

a second XNOR logic gate receiving said value $b_n$ of the bit of rank n of an input binary number B and said value $c_n$ of the bit of rank n of an input binary number C and generating said intermediate signal; and an AND logic gate receiving said first and second intermediate signals and generating said value $R^1{}_{n+1}$ of the bit of rank n+1 of said correction signal $R^1$ for the iteration of index 1.

6. The addition device of claim 4, wherein said initialization unit comprises, for each bit n, an initialization sub-unit comprising:

an XNOR logic gate receiving said value $a_n$ of the bit of rank n of an input binary number A and of the said $b_n$ value of the bit of rank n of an input binary number B and generating a first intermediate signal;

a first XOR logic gate receiving said first intermediate signal and said value said value $c_n$ of the bit of rank n of an input binary number C and generating said value $U^1{}_n$ of the bit of rank n of said estimation signal $U^1$ for the iteration of index 1;

a second XOR logic gate receiving said value $b_n$ of the bit of rank n of an input binary number B and said value $c_n$ of the bit of rank n of an input binary number C and generating a second intermediate signal;

an AND logic gate receiving said first and second intermediate signals and generating a third intermediate signal; and a third XOR logic gate receiving said third intermediate signal and said value $c_n$ of the bit of rank n of an input binary number C and generating said value $H^1{}_{n+1}$ of the bit of rank n+1 of said second correction signal $H^1$ for the iteration of index 1.

7. The addition device of claim 1, wherein the addition device comprises:

first selection means for selecting a first input binary number included in said plurality of input binary numbers;

means for obtaining predetermined initialization values for:
  each of the N bits of an estimation signal $U^0$,
  each of the N bits of a correction signal $R^0$,
  a fictive bit of rank −1 of said estimation signal $U^0$;

first activation means for activating said accumulation unit in order for the accumulation unit to carry out the iteration of index 1 of said accumulation mechanism with, as input signals, said first input binary number and said predetermined initialization values, enabling an estimation signal $U^1$ to be generated on N bits and a first $R^1$ correction signal to be generated on N bits;

second activation means for activating the following, as long as said plurality of input binary numbers have not been taken into account in said addition:

second selection means for selecting a new input binary number included in said plurality of input binary numbers and not already selected;

said accumulation unit in order for same to carry out an iteration of index i+1, with i>0, of said accumulation mechanism with, as input signals, said new input binary number, the signals $U^1$ and $R^i$ generated during the iteration of index i of said accumulation mechanism, a predetermined initialization value $U^i_{-1}$ of a fictive bit of rank −1 of said estimation signal $U^i$, and a predetermined initialization value $R^i_0$ of the bit of rank 0 of said first correction signal $R^i$.

8. The addition device of claim 1, wherein the addition device comprises:

first selection means for selecting a first input binary number included in said plurality of input binary numbers;

means for obtaining predetermined initialization values for:
  each of the N bits of an estimation signal $U^0$,
  each of the N bits of a correction signal $H^0$, first activation means for activating said accumulation unit in order for the accumulation unit to carry out the iteration of index 1 of said accumulation mechanism with, as input signals, said first input binary number and said predetermined initialization values, enabling an estimation signal $U^1$ to be generated on N bits and a second $H^1$ correction signal to be generated on N bits;

second activation means for activating the following means, as long as said plurality of input binary numbers have not been taken into account in said addition:

second selection means for selecting a new input binary number included in said plurality of input binary numbers and not already selected;

said accumulation unit in order for same to carry out an iteration of index i+1, with i>0, of said accumulation mechanism with, as input signals, said new input binary number, the signals $U^1$ and $H^i$ generated during the iteration of index i of said accumulation mechanism, a predetermined initialization value $R^i_0$ of the bit of rank 0 of said first correction signal $R^i$.

9. The adding device of claim 1, wherein the digital processing device is implemented by a combination of hardware and software, which are configured to perform the functions of the first estimation means and the first correction means or the functions of the second estimation means and the second correction means.

10. The adding device of claim 1, wherein each accumulation device is implemented in a digital logic circuit configured to perform the functions of the first estimation means and the first correction means or the functions of the second estimation means and the second correction means.

11. The adding device of claim 1, wherein each accumulation device is implemented by a combination of hardware and software, which are configured to perform the functions of the first estimation means and the first correction means or the functions of the second estimation means and the second correction means.

12. A non-transitory computer-readable storage medium, storing a set of instructions that may be run by a computer in order to implement a method for adding a plurality of input binary numbers each of N bits, wherein the method comprises, when said set of instructions is executed, configuring the computer by the set of instructions to perform digital signal processing, including:

receiving the plurality of input binary numbers, each represented by a digital signal having N bits; and at least one iteration, of index i+1 with i≥0, of an accumulation step that generates an estimation signal $U^{i+1}$ on N bits and generates a first $R^{i+1}$ or second $H^{i+1}$ correction signal on N bits, according to a set of equations selected from the group consisting of:

a first set of equations:

$$\begin{cases} U^{i+1}_n = U^i_n \oplus R^i_n \oplus U^i_{n-1} \oplus c_n \\ R^{i+1}_{n+1} = (U^i_n \oplus R^i_n \oplus U^i_{n-1}) \cdot (U^i_n \oplus c_n) \end{cases}$$

and a second set of equations:

$$\begin{cases} U^{i+1}_n = U^i_n \oplus H^i_n \oplus c_n \\ H^{i+1}_{n+1} = (U^i_n \oplus H^i_n) \cdot \overline{(U^i_n \oplus c_n)} \oplus c_n \end{cases}$$

with:

$U^{i+1}_n$: a value of the bit of rank n of said estimation signal $U^{i+1}$, with 0≤n≤N−1, obtained during said iteration of index i+1;

$U^i_n$: a value of the bit of rank n of an estimation signal $U^i$, obtained during a preceding iteration of index i if i>0, or a determined initialization value $U^0_n$ of the bit of rank n of an estimation signal $U_i$ if i=0;

$U^i_{n-1}$: a value of the bit of rank n−1 of said estimation signal obtained during a preceding iteration of index i if n>0 and if i>0, or a determined initialization value $U^0_{n-1}$ of the bit of rank n−1 of said estimation signal $U^i$ if n>0 and i=0, or a predetermined initialization value of a fictive bit of rank n−1 of said estimation signal $U^i$ if n=0;

$R^i_n$: a value of the bit of rank n of a first correction signal $R^i$, obtained during a preceding iteration of index i if n>0, or a predetermined initialization value of the bit of rank n of said first correction signal $R^i$ if n=0;

$R^{i+1}_{n+1}$: a value of the bit of rank n+1 of said first correction signal $R^{i+1}$, obtained during said iteration of index i+1;

$H^i_n$: a value of the bit of rank n of a second correction signal $H^i$, obtained during a preceding iteration of index i;

$H^{i+1}_{n+1}$: a value of the bit of rank n+1 of said correction signal $H^{i+1}$, obtained during said iteration of index i+1;

$C_n$: a value of the bit of rank n of an input binary number C included in said plurality of input binary numbers and taken into account in said addition during said iteration of index i+1 of said accumulation step, the estimation signal $U^i$ and the first correction signal $R^i$ or the second correction signal $H^i$ representing a sum of at least two of the input binary numbers in redundant form, the estimation signal $H^{i+1}$ and the first correction signal $R^{i+1}$ or the second correction signal $H^{i+1}$ representing the sum of said at least two binary numbers in redundant form and of the binary number c, wherein the last iteration of $U_n$ is the sum $S_n$ of the bit of rank n.

* * * * *

UNITED STATES PATENT AND TRADEMARK OFFICE
CERTIFICATE OF CORRECTION

PATENT NO. : 8,788,563 B2
APPLICATION NO. : 12/936337
DATED : July 22, 2014
INVENTOR(S) : Daniel Torno It is certified that error appears in the above-identified patent and that said Letters Patent is hereby corrected as shown below:

In the claims

In claim 12, column 26, line 34, delete:

"$U_i$ if i=0;"

and insert therefor:

-- $U^i$ uf i = 0; --.

In claim 12, column 26, line 35, after "said estimation signal" insert -- $U^i$, --.

Signed and Sealed this
Third Day of May, 2016

Michelle K. Lee
*Director of the United States Patent and Trademark Office*